United States Patent
Yang

(10) Patent No.: US 11,673,098 B2
(45) Date of Patent: Jun. 13, 2023

(54) HYBRID MEMBRANE FOR GAS SEPARATION

(71) Applicant: Saudi Arabian Oil Company, Dhahran (SA)

(72) Inventor: Junyan Yang, Acton, MA (US)

(73) Assignee: Saudi Arabian Oil Company, Dhahran (SA)

(*) Notice: Subject to any disclaimer, the term of this patent is extended or adjusted under 35 U.S.C. 154(b) by 238 days.

(21) Appl. No.: 17/140,393

(22) Filed: Jan. 4, 2021

(65) Prior Publication Data

US 2022/0212149 A1 Jul. 7, 2022

(51) Int. Cl.
| | | |
|---|---|---|
| *B01D 69/12* | (2006.01) | |
| *B01D 67/00* | (2006.01) | |
| *C08F 20/14* | (2006.01) | |
| *C08G 69/40* | (2006.01) | |
| *C08G 69/44* | (2006.01) | |
| *C08G 77/04* | (2006.01) | |
| *B82Y 30/00* | (2011.01) | |
| *B82Y 40/00* | (2011.01) | |

(52) U.S. Cl.
CPC ....... *B01D 69/125* (2013.01); *B01D 67/0006* (2013.01); *C08F 20/14* (2013.01); *C08G 69/40* (2013.01); *C08G 69/44* (2013.01); *C08G 77/045* (2013.01); *B01D 2323/30* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | |
|---|---|---|---|
| 7,410,525 | B1 | 8/2008 | Liu et al. |
| 7,998,246 | B2 | 8/2011 | Liu et al. |
| 9,452,392 | B2 | 9/2016 | Sano et al. |
| 10,363,546 | B2 | 7/2019 | Song et al. |
| 2011/0120940 | A1 | 5/2011 | Allen et al. |
| 2019/0321787 | A1 | 10/2019 | Sivaniah et al. |

FOREIGN PATENT DOCUMENTS

| | | |
|---|---|---|
| CN | 108126534 | 12/2020 |
| WO | 2015129925 | 9/2015 |

OTHER PUBLICATIONS

Gamali et al, "Distinguished discriminatory separation of CO2 from its methane-containing gas mixture via PEBAX mixed matrix membrane", Chinese Journal of Chemical Engineering 26 (2018) 73-80 (Year: 2018).*

(Continued)

*Primary Examiner* — Krishnan S Menon
(74) *Attorney, Agent, or Firm* — Fish & Richardson P.C.

(57) ABSTRACT

A gas separation membrane, a method for making the gas separation membrane, and a method for using the gas separation membrane are provided. An exemplary gas separation membrane includes a polyether-block-polyamide (PEBA) matrix and a cross-linked network including functionalized polyhedral oligomeric silsesquioxane (POSS) nanoparticles dispersed through the PEBA matrix.

5 Claims, 16 Drawing Sheets

(56) References Cited

OTHER PUBLICATIONS

Akbarzadeh et al., "High performance compatible thiazole-based polymeric blend cellulose acetate membrane as selective $CO_2$ absorbent and molecular sieve." Carbohydrate Polymers 252, Jan. 2021, 11 pages.
Yong et al., "Recent advances in polymer blend membranes for gas separation and pervaporation." Progress in Materials Science 116, Feb. 2021, 33 pages.
PCT International Search Report and Written Opinion in International Appln. No. PCT/US2022/011062, dated Apr. 29, 2022, 13 pages.
Le et al., "Pebax/POSS mixed matrix membranes for ethanol recovery from aqueous solutions via pervaporation." Journal of Membrane Science 379.1-2, Sep. 2011, 174-183, 10 pages.
Madhavan et al., "Poly (dimethylsiloxane-urethane) membranes: effect of linear siloxane chain and caged silsesquioxane on gas transport properties." Journal of Polymer Research 18.6, Nov. 2011, 1851-1861, 11 pages.
Rahman et al., "Influence of temperature upon properties of tailor-made PEBAX® MH 1657 nanocomposite membranes for post-combustion $CO_2$ capture." Journal of Membrane Science 469, Nov. 2014, 344-354, 11 pages.
PCT International Search Report and Written Opinion in International Appln. No. PCT/US2022/011124, dated Apr. 12, 2022, 18 pages.
U.S. Appl. No. 17/140,395, Yang, filed Jan. 4, 2021.
Amici et al., "UV Processing and Characterization of polyhedral oligomeric silsesquioxane (POSS) nanocomposites", European Society for Composite Materials 2004, 10 pages.
Chua et al., "Polyetheramine-polyhedral oligomeric silsesquioxane organic-inorganic hybrid membranes for $CO_2/H_2$ and $CO_2/N_2$ separation", Journal of Membrane Science, 385-386, 2011, 40-48, 9 pages.
Du et al., "Polymers of intrinsic microporosity containing trifluoromethyl and phenylsulfone groups as materials for membrane gas separation." Macromolecules 41.24, 2008, 9656-9662, 7 pages.
Guerrero et al., "Investigation of amino and amidino functionalized Polyhedral Oligomeric Silsesquioxane (POSS®) nanoparticles in PVA-based hybrid membranes for $CO_2/N_2$ separation", Journal of Membrane Science, 544, 2017, 161-173, 13 pages.
Hao et al., "PIM-1 as an organic filler to enhance the gas separation performance of Ultem polyetherimide," Journal of Membrane Science, 453: Mar. 2014, 614-623, 10 pages.
Hou et al., "PIM-1 as an organic filler to enhance $CO_2$ separation performance of poly (arylene fluorene ether ketone)," Separation and Purification Technology, 242:116766, Jul. 2020, 9 pages.
Iyer et al., "Gas transport properties of polyimide-POSS nanocomposites", Journal of Membrane Science, 358, 2010, 26-32, 7 pages.
Kinoshita et al., "Enhanced PIM-1 membrane gas separation selectivity through efficient dispersion of functionalized POSS fillers", Journal of Membrane Science, 539, 2017, 178-186, 9 pages.
Konnertz et al., "Molecular mobility and gas transport properties of nanocomposites based on PIM-1 and polyhedral oligomeric phenethyl-silsesquioxane (POSS)", Journal of Membrane Science, 529, 2017, 274-285, 43 pages.
Li et al., "Effects of amino functionalized polyhedraloligomeric silsesquioxanes on cross-linked poly (ethylene oxide) membranes for highly-efficient $CO_2$ separation", Chemical Engineering Research & Design., 122, 2017, 280-288, 9 pages.
Li et al., "High-Performance Thermally Self-Cross-Linked Polymer of Intrinsic Microporosity (PIM-1) Membranes for Energy Development", *Macromolecules*, 45, 2012, 1427-1437, 11 pages.
Li et al., "Molecular-level mixed matrix membranes comprising Pebax and POSS for hydrogen purification via preferential $CO_2$ removal", International J. Hydrogen Energy, 35, 2010, 10560-10568, 9 pages.
Mohamed et al., "Functional Polyimide/Polyhedral Oligomeric Silsesquioxane Nanocomposites", Polymer, 11, 26, 2019, 17 pages.
Przadka et al., "Multimethacryloxy-POSS as a crosslinker for hydrogel materials", European Polymer Journal, 72, 2015, 34-49, 16 pages.
Rahman et al., "Functionalization of POSS nanoparticles and fabrication of block copolymer nanocomposite membranes for $CO_2$ separation", Reactive & Functional Polymer, 86, 2015, 125-133, 33 pages.
Rahman et al., "PEBAX® with PEG functionalized POSS as nanocomposite membranes for $CO_2$ separation", Journal of Membrane Science, 437, 2013, 286-297, 66 pages.
Rahman et al., "PEG functionalized POSS incorporated Pebax nanocomposite membranes", Procedia Engineering, 44, 2012, 1523-1526, 4 pages.
Rao et al., "Preparation and oxygen/nitrogen permeability of PDMS crosslinked membrane and PDMS/tetraethoxysilicone hybrid membrane", J. Membr. Sci. 303, 2007, 132-139, 8 pages.
Rezakazemi et al., "Synthesis and gas transport properties of crosslinked poly(dimethylsiloxane) nanocomposite membranes using octatrimethylsiloxy POSS nanoparticles", Journal of Natural Gas Science & Engineering, 30, 2016, 10-18, 37 pages.
Robeson, "The Upper Bound Revisited," Journal of Membrane Science, Jul. 2008, 320:390-400, 11 pages.
Salehian et al., "Development of high performance carboxylated PIM-1/P84 blend membranes for pervaporation dehydration of isopropanol and $CO_2/CH_4$ separation," Journal of Membrane Science, 518: Nov. 2016, 110-119, 10 pages.
Sánchez-Laínez et al., "Polymer engineering by blending PIM-1 and 6FDA-DAM for ZIF-8 containing mixed matrix membranes applied to $CO_2$ separations," Separation and Purification Technology, 224: Oct. 2019, 456-462, 7 pages.
Song et al., "Controlled thermal oxidative crosslinking of polymers of intrinsic microporosity towards tunable molecular sieve membranes", *Nature Communication 5.1*, 2014, 12 pages.
Wei et al., "POSS-based hybrid porous materials with exceptional hydrogen uptake at low pressure", Microporous & Mesoporous Materials, 193, 2014, 35-39, 5 pages.
Yong et al., "Molecular engineering of PIM-1/Matrimid blend membranes for gas separation," Journal of Membrane Science, Jul. 2012, 407-408, 45-57, 11 pages.
Yong et al., "Molecular interaction, gas transport properties and plasticization behavior of cPIM-1/Torlon blend membranes," Journal of Membrane Science, 462: Jul. 2014, 119-130, 12 pages.
Zhang et al., "Polymer/polyhedral oligomeric silsesquioxane (POSS) nanocomposites: An overview of fire retardance", Progress in Polymer Science, 67, 2017, 77-125, 49 pages.
Zhao et al., "Blending of compatible polymer of intrinsic microporosity (PIM-1) with Tröger's Base polymer for gas separation membranes," Journal of Membrane Science, 566: Nov. 2018, 77-86, 34 pages.

* cited by examiner

800

US 11,673,098 B2

HYBRID MEMBRANE FOR GAS SEPARATION

TECHNICAL FIELD

The present disclosure is directed to polymeric membranes for gas separation. More specifically, the membranes are hybrid structures formed from a block copolymer

BACKGROUND

Natural gas supplies 22% of the energy used worldwide, and makes up nearly a quarter of electricity generation. Further, natural gas is an important feedstock for the petrochemicals industry. According to the International Energy Agency (IEA), the worldwide consumption of natural gas is projected to increase from 120 trillion cubic feet (Tcf) in the year 2012 to 203 Tcf by the year 2040.

Raw, or unprocessed, natural gas is formed primarily of methane ($CH_4$), however it may include significant amounts of other components, including acid gases (carbon dioxide ($CO_2$) and hydrogen sulfide ($H_2S$)), nitrogen, helium, water, mercaptans, and heavy hydrocarbons ($C_{3+}$), among other components. These contaminants must be removed during gas processing in order to meet the standard pipeline specifications of sales gas. In particular, the removal of acid gases ($CO_2$ and $H_2S$) has been a significant research topic due to the problematic effects of acid gases on natural gas heating value, pipeline transportability, and pipeline corrosion in the presence of water.

Currently, the majority of gas processing plants remove $CO_2$ and $H_2S$ from natural gas by absorption technology, such as amine adsorption. However, several drawbacks are associated with this technology, including energy usage, capital cost, maintenance requirements, and the like.

SUMMARY

An embodiment described in examples herein provides a gas separation membrane. The gas separation membrane includes a polyether-block-polyamide (PEBA) matrix and a cross-linked network including functionalized polyhedral oligomeric silsesquioxane (POSS) nanoparticles dispersed through the PEBA matrix.

Another embodiment described in methods herein provides a method for forming a gas separation membrane. The method includes forming a polymer solution of polyether-block-polyamide (PEBA) and forming a suspension of functionalized polyhedral oligomeric silsesquioxane (POSS) nanoparticles. A first portion of the polymer solution is blended with the suspension to coat the functionalized POSS nanoparticles with PEBA, forming a primed suspension. The remaining portion of the polymer solution is blended with the primed suspension to form a PEBA/POSS solution. A free radical photoinitiator is added to the PEBA/POSS solution. A dense film is formed from the PEBA/POSS solution. The dense film is dried to form a dried film including functionalized POSS nanoparticles in a PEBA matrix. The dried film is exposed to ultraviolet (UV) radiation to cross-link the functionalized POSS nanoparticles in the PEBA matrix forming a PEBA/XLPOSS membrane.

Another embodiment described in examples herein provides a method for removing an acid gas from a natural gas feedstock to form a sweetened natural gas. The method includes flowing the natural gas feedstock over a membrane, wherein the membrane includes a polyether-block-polyamide (PEBA) matrix and a cross-linked network including functionalized polyhedral oligomeric silsesquioxane (POSS) nanoparticles dispersed through the PEBA matrix. The acid gases isolated in a permeate from the membrane. The sweetened natural gas is produced in a retentate from the membrane.

DETAILED DESCRIPTION

Figure 1:
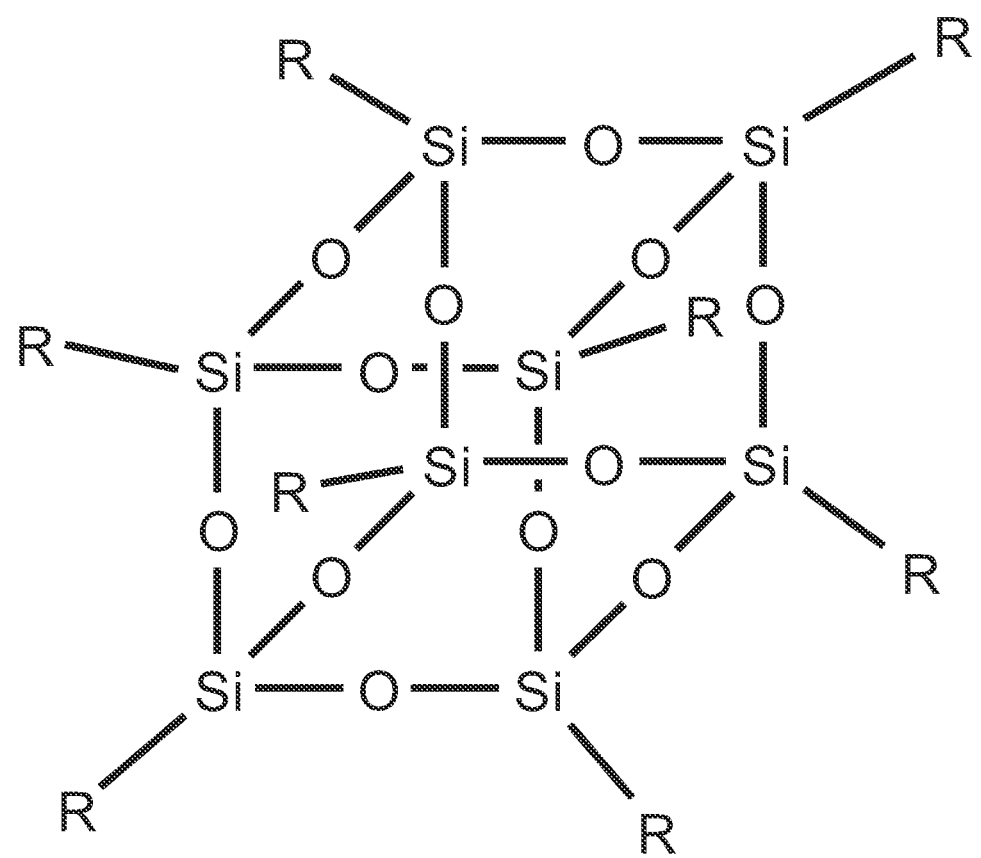
FIG. 1 is a drawing of the molecular structure of polyhedral oligomeric silsesquioxane (POSS), $(RSiO_3/2)_n$, with n=8.

As separation technologies advance, the use of polymeric membrane-based technology for gas separation has been increasingly explored over the past years due to the potential for energy efficiency, small footprint, and low capital cost. Although current membrane technology does not outperform absorption systems, hybrid systems using absorption and membranes have proved to be a potentially attractive alternative. For membrane systems, it is desirable to have polymeric membranes with improved separation performance.

Polymeric membranes are thin semipermeable barriers that selectively separate some gas compounds from others. Generally, polymeric membranes do not operate as a filter, where small molecules are separated from larger ones through a medium with pores, rather it separates based on how well different compounds dissolve into the membrane and diffuse through it (the solution-diffusion model).

Numerous polymeric membranes for gas separation have been developed in the decades, but few are currently commercialized for use in sour gas separation applications. Examples of polymeric materials used to form gas separation membranes include cellulose acetate (CA), polyimides (PI), and perfluoropolymers, such as polytetrafluoroethylene (PTFE), perfluorocycloalkene (PFCA), and the like. These polymeric materials are generally semi-crystalline polymers having a $T_g$ of greater than about 100° C.

The glassy polymeric materials are considered promising for forming membranes for $CO_2$ removal from natural gas, e.g., $CO_2$-selective membranes. However, polymeric membranes formed from glassy polymeric materials are known to be susceptible to plasticization and physical aging under mixed sour gas conditions, for example, by $CO_2$, $H_2S$ or $C_{3+}$ hydrocarbons components in the feed gas. Plasticization increases the flexibility of the polymer chains and can dramatically alter separation performance, reduce the mechanical strength, speed up aging effects, and result in catastrophic membrane failure.

Accordingly, rubbery polymeric membrane materials, such as polyethylene oxide (PEO) and polyether block amide (PEBA) have been investigated extensively for sour gas separation applications. PEBA is a hydrophilic thermoplastic elastomer that is commercially available in the Pebax® family of thermoplastic elastomers from Arkema chemical or the Vestamid® family of thermoplastic elastomers from Evonik Industries. The polar ether groups, such as the ethylene oxide monomer units, have a high affinity for $H_2S$ and $CO_2$ molecules. Accordingly, PEBA membranes have shown good performance in sour gas separation, especially for separation of $H_2S/CH_4$, such as in $H_2S$-selective membranes.

However, PEBA membranes separate gases based on selective solubility of gas molecules. Accordingly, the separation efficiency for $CO_2/CH_4$ mixtures tends to fall below state-of-the art glassy polymers such as cellulose acetate (CA) and polyimide (PI), which separate gas molecules primarily based on size selectivity.

To improve separation performance and stability, new membrane materials, including new polymeric materials and modifications of existing polymeric materials have been studied. However, some barriers, such as trade-offs in selectivity versus permeability, may prevent the deployment of these materials in industrial processes. One approach that has been studied is the modification of a polymeric membrane with the incorporation of inorganic fillers. This may increase the removal efficiency of organic compounds. Further, these membranes, termed organic-inorganic hybrid membranes or mixed matrix membranes (MMMs), have the potential to combine desirable properties of organic and inorganic systems. For example, MMMs may have improved thermal and chemical stability, plasticization and aging resistance, and transport properties. MMMs have been studied for gas separations that include inorganic fillers such as porous fillers (e.g. zeolite, carbon molecular sieves, metal-organic frameworks (MOFs), carbon nanotubes (CNTs), porous organic cages (POCs)) and nonporous fillers (e.g. silica ($SiO_2$), Titanium dioxide ($TiO_2$) etc.) dispersed in polymer membrane matrix. However, the incorporating inorganic fillers into a membrane matrix has been problematic, for example, due to poor interface adhesion between polymers and fillers, filler agglomeration, and the like, which constrain the loading of the filler material in the membrane matrix. Further, these problems affect membrane separation performance, due to large differences in the physical and chemical properties between polymers and inorganic fillers.

Embodiments described herein provide a hybrid membrane material that includes a PEBA base matrix with a cross-linked network formed from a polyhedral oligomeric silsesquioxane (POSS). The POSS network is formed by cross-linking reactive groups coupled to the POSS groups using a photoinitiator after a membrane has been formed.

FIG. 1 is a drawing of the molecular structure of polyhedral oligomeric silsesquioxane (POSS) $(RSiO_3/2)_n$, where n=8. POSS is a cage-like molecule containing an inner inorganic framework ($Si_8O_{12}$ core) with an external shell of organic substituents (R) at each of the eight vertices, forming an intrinsic inorganic-organic architecture. In this structure, the R groups can include hydrogen, unreactive organic groups, such as alkyl groups, or reactive organic groups, such as acrylate or methacrylate groups (hereinafter termed "(meth)acrylate"). The R groups are not limited to a single type, but may include a mixture of R groups selected to modify the properties, for example, to increase or decrease the interconnections between the POSS molecules.

As the structure is well defined, and the functional groups attached to the apex silicon atoms may be selected based on the application, POSS nanoparticles may be designed that are compatible with diverse polymer matrices. Accordingly, the addition of POSS nanoparticles to polymer matrices may be used to enhance physical properties and other performance parameters. For example, incorporating functionalized POSS nanoparticles into polymers, for example, by physical blending or grafting to the backbone, may improve thermal and mechanical properties, for example, decreasing flammability, viscosity, and heat discharge, and increasing rigidity, strength, and modulus.

As described herein, a method is provided to blend POSS materials as fillers in a PEBA matrix, forming a membrane from the blend, and then cross-linking the POSS materials after the membrane is formed. The resulting organic-inorganic hybrid membranes achieve high membrane sour separation efficiency, such as $CO_2/CH_4$ and $H_2S/CH_4$ selectivities, and have enhanced membrane stability and durability. Further, the hybrid membranes have improved mechanical strength and resistance to plasticization for sour gas separation applications.

Figure 2:
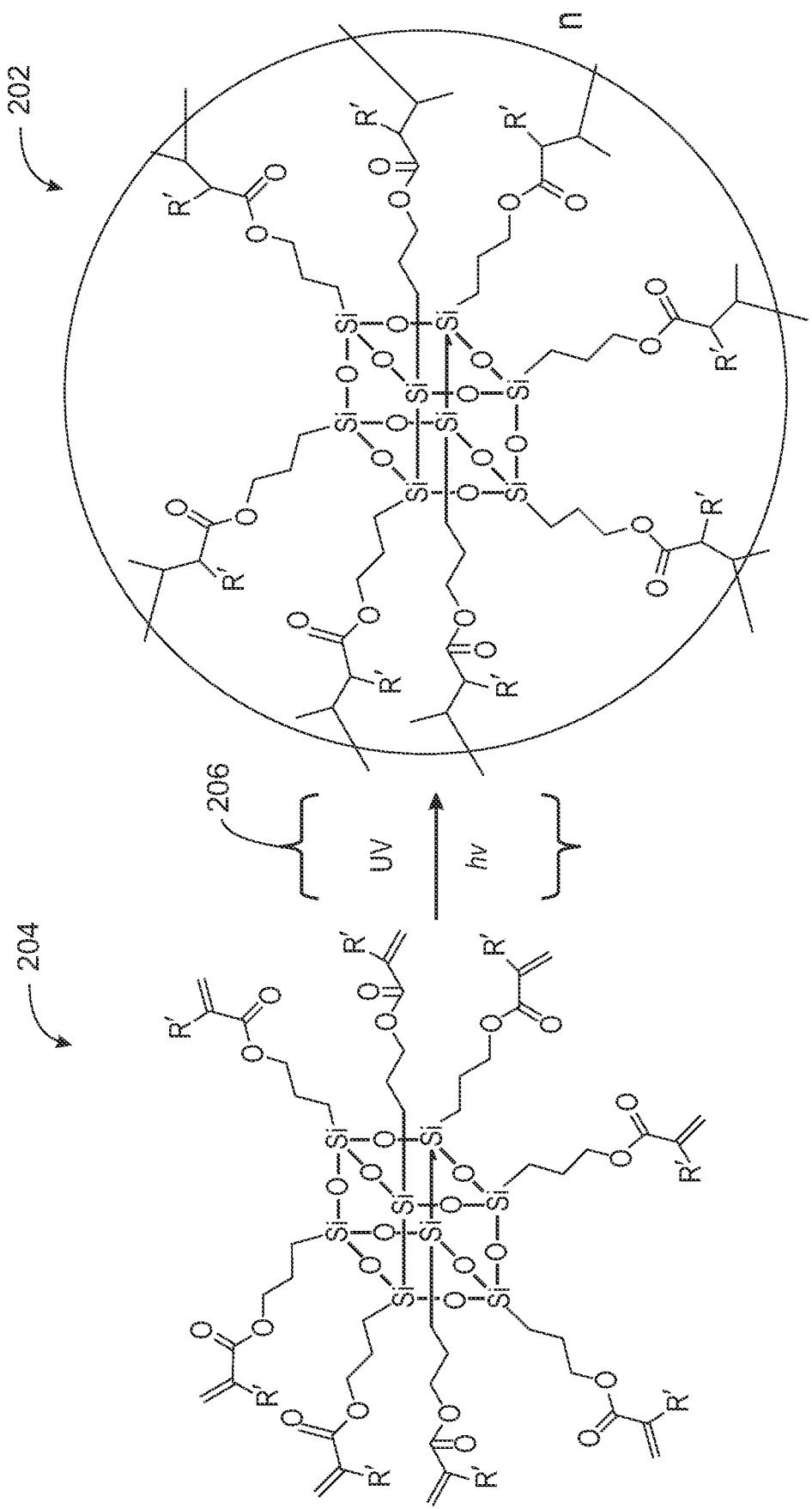
FIG. 2 is a schematic drawing of the synthesis of cross-linked porous POSS materials through free radical photopolymerization.

FIG. 2 is a schematic drawing of the synthesis of forming crosslinked POSS material 202 through free radical photopolymerization. The crosslinking can be performed by UV initiated radical polymerization 206 of a (meth)acrylate-functionalized POSS nanostructures 204. The (meth)acrylate-functionalized-POSS nanostructures 204 have a POSS cage as a core and the eight (meth)acrylate groups attached at the corners of the POSS cage.

As shown in FIG. 2, if R' is a methyl group, then the functional group is methacrylate, and if R' is a hydrogen group, then the functional group is acrylate. Thus, the particular (meth)acrylate-functionalized-POSS nanostructures 204 include acrylate functionalized POSS nanostructures, termed acrylo-POSS nanostructures herein $((C_6H_9O_2)_8(SiO_{1.5})_8$ with a molecular weight of 1322 g/mol), and methacrylate functionalized POSS nanostructures, termed methacryl-POSS nanostructures $((C_7H_{11}O_2)_8(SiO_{1.5})_8$ with a molecular weight of 1433 g/mol).

Figure 3:
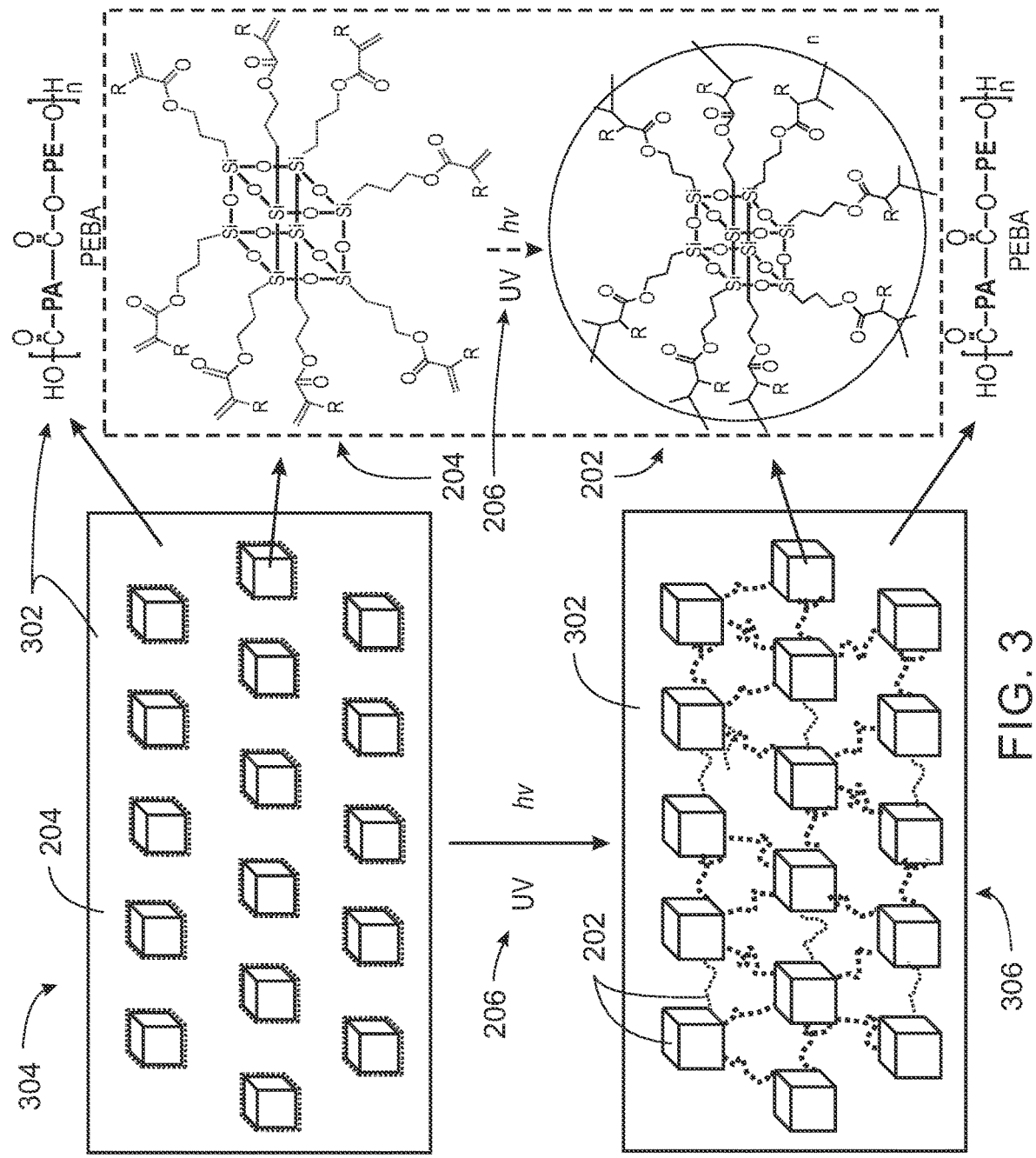
FIG. 3 is a schematic drawing of a process for preparing (PEBA)-(POSS crosslinked) hybrid membranes, termed PEBA/XLPOSS hybrid membranes.

FIG. 3 is a schematic drawing of the fabrication of a hybrid membrane by cross-linking (meth)acrylate-functionalized-POSS nanostructures 204 after they are incorporated into a PEBA matrix 302. Like numbered items are as described with respect to FIG. 2. As described herein, once the (meth)acrylate-functionalized-POSS nanostructures 204 are blended into the PEBA matrix 302, the blend is used to form a PEBA/uncrosslinked POSS hybrid membranes, referred to herein as a PEBA/POSS membrane 304. The UV initiated radical polymerization 206 cross-links the (meth)acrylate-functionalized-POSS nanostructures 204 forming the cross-linked POSS material 202 as an in-situ filler into the PEBA matrix 302. The resulting PEBA/cross-linked POSS hybrid membrane is referred to herein as a PEBA/XLPOSS membrane 306. The PEBA/XLPOSS membrane 306 has improved functionality over a neat PEBA membrane and a PEBA/POSS membrane 304, including a significant increase in membrane sour gas separation performance, as well as high plasticization resistance and enhanced mechanical strength under simulated field-testing conditions, such as 20% sour gas feed, and feed pressure up to 800 psi.

EXAMPLES

Preparation of Membranes

Figure 4:
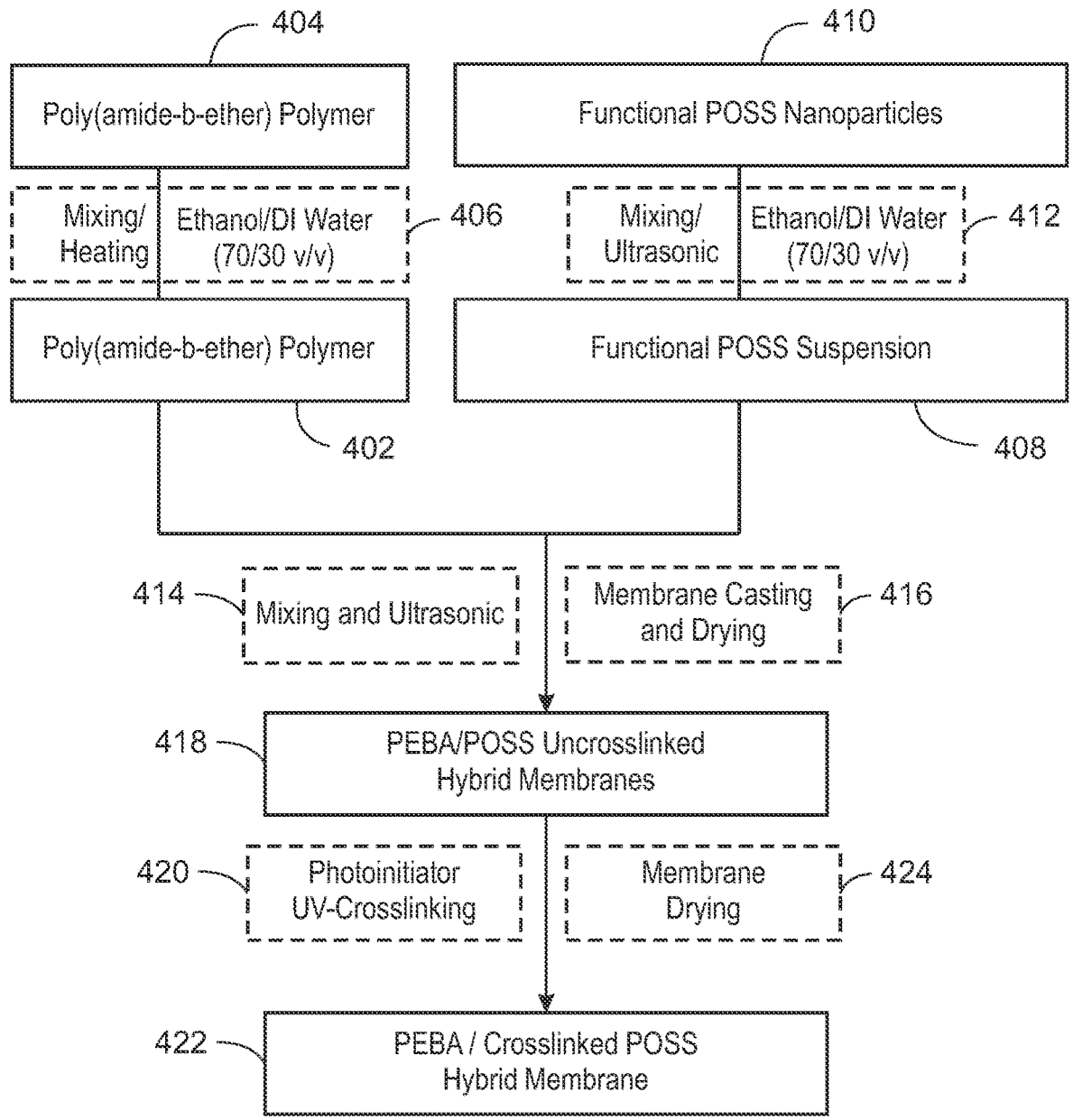
FIG. 4 is a schematic drawing of the fabrication of a hybrid membrane fabrication by incorporating crosslinked POSS porous materials in PEBA membrane matrix.

FIG. 4 is a schematic drawing of a method 400 for preparing a PEBA/XLPOSS membrane. The method 400 begins with the preparation of a PEBA polymer solution 402. The PEBA polymer solution 402 is prepared by heating and mixing 406 dried Pebax® 1657 resin 404 in a mixture of ethanol and deionized water (70/30 v/v) to form a solution with a concentration of about 1 to about 10 weight percent (wt. %).

A suspension 408 of functionalized POSS nanoparticles 410 is then formed by the mixing and sonication 412 (e.g., using an ultrasonic probe) of the functionalized POSS nanoparticles 410 in a mixture of ethanol and deionized water (70/30 v/v). Suspensions with different loadings of the functional POSS nanoparticles (2.5 wt. % to 50 wt. % of the Pebax® 1657) were prepared.

The PEBA polymer solution 402 and the suspension 408 was then used to form 414 a mixture of PEBA/POSS. To form the mixture, a quarter of the PEBA polymer solution 402 was added to the suspension 408. The addition of the PEBA polymer solution 402 acts as a primer to coat the surface of the functionalized POSS nanoparticles 410 with PEBA to help promote adhesion to the polymeric phase and to prevent particle aggregation during film preparation. Subsequently, the mixture was stirred for 0.5 h to ensure homogenous dispersion of the coated particles. Next, the remaining PEBA polymer solution 402 was poured into the primed POSS/PEBA solution, and the mixture was stirred and sonicated for 0.5 h, respectively. Finally, an appropriate amount of photoinitiator was added to the PEBA/POSS solution and mechanical stirred at 60° C. for 0.5 h, after which it was heated to 50-60° C. to remove gas bubbles. In this example, the photoinitiator used was 1-hydroxycyclohexyl phenyl ketone (HCPK), although other photoinitiators may be used. The photoinitiator was added at about 4 wt. % of the weight of the functionalized POSS nanoparticles 410.

The PEBA/POSS solution was used to fabricate 416 a PEBA/POSS membrane 418. The PEBA/POSS membrane 418 was synthesized by pouring the PEBA/POSS into a PTFE flat-bottomed Petri dish to form a membrane layer. The membrane layer was dried at room temperature overnight with a cover for slow solvent evaporation to form the PEBA/POSS membrane 418. The PEBA/POSS membrane 418 was removed from the PTFE Petri dishes for further crosslinking.

The PEBA/POSS membrane 418 was then cross-linked 420 to form the final PEBA/XLPOSS membrane 422. The PEBA/POSS membrane 418 was exposed to 318 nm UV light in a UV Crosslinker device (Model 13-245-221, Fisher Scientific) with intensity of 12,000 mW/cm$^2$ for 180 seconds at 25° C. The exposure triggered the free radical photoinitiator, causing the polymerization of the functionalized POSS nanoparticles 410, forming a cross-linked network embedded in the PEBA matrix. The PEBA/XLPOSS membrane obtained was dried 424 by being placed in a vacuum oven at 60° C. for at least 48 hours.

The in-situ crosslinked POSS nanoparticles in the PEBA membrane matrix improve membrane mechanical strength and stiffness. For example, PEBA/XLPOSS crosslinked hybrid membranes demonstrate significantly increased tensile stress and Young's modulus. In one example, a PEBA/XLPOSS membrane had a tensile stress at break of 21.5 MPa and Young's modulus of 157.0 MPa, compared to a neat PEBA membrane, which had a tensile stress of 12.7 MPa and a Young's modulus of 89.0 MPa. Under the same loading of POSS, PEBA/XLPOSS crosslinked hybrid membranes exhibit significant improvement in membrane mechanical strength, for example, a 5-31% increase in tensile stress and a 4-370% increase in Young's modulus, compared to PEBA/POSS membranes.

Further, the formation of the crosslinked POSS nanoparticles in the PEBA membrane matrix improves the gas separation performance. Under single gas testing at a feed temperature of 25° C. and a feed pressure of 100 psi, PEBA/XLPOSS membranes show increased $CO_2/CH_4$ selectivity compared to neat PEBA membrane and PEBA/POSS membranes. In one example, a PEBA/XLPOSS membrane had a $CO_2/CH_4$ single gas selectivity with 28.04, compared to a neat PEBA membrane with 23.21, and a PEBA/POSS hybrid membrane with 20.14.

Under binary gas mixture testing, using a mixture of 20 vol. % $CO_2$ and 80 vol. % $CH_4$ at 800 psi, PEBA/XLPOSS membranes also show increased $CO_2/CH_4$ mixed selectivity compared to neat PEBA membrane and PEBA/POSS membranes. In one example, a PEBA/XLPOSS membrane had a $CO_2/CH_4$ mixed gas selectivity of 20.24, compared to a neat PEBA membrane with a $CO_2/CH_4$ mixed gas selectivity of 17.86, and a PEBA/POSS membrane with a $CO_2/CH_4$ mixed gas selectivity of 16.70.

The addition of crosslinked POSS nanoparticles in PEBA membrane matrix was also successful in improving the sour gas separation performance at feed pressure of 800 psi. Under 5 vol. % sour gas feed testing, at 3 vol. % $CO_2$, 5 vol. % $H_2S$, and 92 vol. % $CH_4$, PEBA/XLPOSS membranes show an improvement in sour gas separation performance, for example, a 4-13% increase in $CO_2/CH_4$ selectivity and a 3-9% increase in $H_2S/CH_4$ mixed gas selectivity, compared to neat PEBA membranes.

Under stimulated typical field gas testing conditions, e.g., 10% $CO_2$, 20% $H_2S$, 10% $N_2$, 3% $C_2H_6$, and 57%, the PEBA/XLPOSS membranes show and improvement in sour gas separation performance, for example, 5.5-15% increase in $CO_2/CH_4$ selectivity and a 13-25% increase in $H_2S/CH_4$ mixed gas selectivity, compared to neat PEBA membranes.

The PEBA/XLPOSS membranes demonstrate significantly enhancement in resistance to both $CO_2$ and $H_2S$ plasticization in the more concentrated $H_2S$ stream (20%) compared to a neat PEBA membrane. A neat PEBA membrane exhibited 134% and 298% increase in $CO_2$ and 132% and 271% increase in $H_2S$ permeabilities under the feed pressure of 500 psi and 800 psi, respectively, compared to that under feed pressure of 200 psi. While PEBA/XLPOSS crosslinked hybrid membrane shows only about 97% and 188% increase in $CO_2$ and 93% and 186% increase in $H_2S$ permeabilities under the feed pressure of 500 psi and 800 psi, respectively, compared to that under feed pressure of 200 psi. This is mainly attributed to the incorporation of crosslinked POSS nanoparticles in PEBA membrane matrix resulting in the reduction of chain packing and mobility.

The PEBA/XLPOSS crosslinked hybrid membranes exhibited significant improvement in $H_2S$ separation performance (25% increase in $H_2S/CH_4$ selectivity) compared to $CO_2$ separation performance (15% increase in $CO_2/CH_4$ selectivity), indicating that these crosslinked hybrid membranes have high $H_2S$ separation efficiency ($H_2S$-selective membrane) under the high-pressure 20% sour gas feed.

Example Membrane 1

Preparation of PEBA/UV Crosslinked Acrylated-POSS Hybrid Membranes (PEBA/XLPOSS Membrane)

PEBA/XLPOSS crosslinked hybrid membranes with different loadings (2.5-50 wt. %) of acrylo-POSS nanoparticles were prepared by the method 400 described with respect to FIG. 4. The acrylo-POSS nanoparticles were purchased from Hybrid Plastics of Hattiesburg, Miss., USA, and used without further modification.

For a typical film preparation procedure a sample of 0.8 g Pebax® 1657 from Arkema Inc. was dissolved in a mixture of 20 mL ethanol/deionized (DI) water (70/30 v/v). The reaction mixture was vigorously stirred at 85° C. under reflux for at least 6 hours to obtain a homogeneous solution. Subsequently, 0.08 g (10 wt. % of the weight of the Pebax® 1657 used) acrylo-POSS cage mixture (($C_6H_9O_2$)$_8$($SiO_{1.5}$)$_8$ having a molecular weight of 1322 g/mol) were dispersed and sonicated in 10 mL ethanol/deionized (DI) water (70/30 v/v). Then a quarter of the PEBA solution was added to the POSS/ethanol/DI water solution. The addition of PEBA solution acts as a primer to cover the POSS surface with polymer to help promote adhesion to the polymeric phase and to prevent particle aggregation during film preparation.

The mixture was stirred for 0.5 h to ensure homogenous dispersion of the particles. Then, the solution mixture was further sonicated for the same time duration. After that, the remaining PEBA solution was poured into the primed POSS/PEBA solution, and it was again sequentially stirred and sonicated for 0.5 h each. Then 12.8 mg (4 wt. % of the weight of the POSS used) of 1-hydroxycyclohexyl phenyl ketone (HCPK) as a photoinitiator was added into the PEBA/POSS solution and mechanically stirred at 60° C. for 0.5 h. The solution was allow to sit without stirring at 50-60° C. to remove gas bubbles and then poured into a PTFE flat-bottomed Petri dish to prepare a dense film. The dense film was covered and dried at room temperature overnight for slow solvent evaporation. The dense film was then removed from PTFE Petri dishes for further crosslinking.

The obtained PEBA/POSS membrane was photopolymerized by exposure to 318 nm UV light in a UV Crosslinker device (Model 13-245-221, Fisher Scientific) with an intensity of 12,000 mW/cm$^2$ for 180 seconds at 25° C. The obtained PEBA/XLPOSS membrane was placed in a vacuum oven for further drying at 60° C. for at least 48 hours.

The procedure for the fabrication of the PEBA/XLPOSS membrane was repeated to form PEBA/XLPOSS membranes consisting of 2.5 wt. %, 5 wt. %, 20 wt. % 30 wt. %, 40 wt. % and 50 wt. % loadings of the acrylo-POSS network. The resultant hybrid membranes, having an average thickness of 30 to 70 μm, were processed for physical property characterization and gas permeation testing.

Example Membrane 2

Preparation of PEBA/UV Crosslinked Methacryl-POSS Hybrid Membranes (PEBA/XLMPOSS Membrane)

PEBA/POSS crosslinked hybrid membranes with different loadings (2.5-50 wt. %) of methacryl-POSS nanoparticles relative to the PEBA matrix were prepared by the techniques described with respect to FIG. 4. The methacryl-POSS nanoparticles were purchased from Hybrid Plastics and used without further modification.

In a typical film preparation procedure, a sample of 0.8 g Pebax® 1657 from Arkema Inc. was dissolved in a mixture of 20 mL ethanol/deionized (DI) water (70/30 v/v). The reaction mixture was vigorously stirred at 85° C. under reflux for at least 6 hours to obtain a homogeneous solution. Subsequently, 0.08 g (10 wt. % of the weight of Pebax® 1657 used) of a methacryl-POSS cage mixture (($C_7H_{11}O_2$)$_8$($SiO_{1.5}$)$_8$ having a molecular weight of 1434 g/mol) were dispersed and sonicated in 10 mL ethanol/deionized (DI) water (70/30 v/v). Then a quarter of the PEBA solution was added to the POSS/ethanol/DI water solution. The addition of PEBA solution acts as a primer to cover the POSS surface with the PEBA polymer to help promote adhesion to the polymeric phase and to prevent particle aggregation during film preparation. Subsequently, stirring of the mixture was conducted for 0.5 h to ensure homogenous dispersion of the particles. Then, the solution mixture was further sonicated at the same time duration. After that, the remaining PEBA solution was poured into the primed POSS/PEBA solution, and it was again sequentially stirred and sonicated for 0.5 h, each. Then 12.8 mg (4 wt. % of weight of the functionalized POSS used) 1-hydroxycyclohexyl phenyl ketone (HCPK) as a photoinitiator was added into the PEBA/POSS solution and mechanical stirred at 60° C. for 0.5 h. The solution was then allowed to sit without stirring at 50-60° C. to remove gas bubbles and then poured into PTFE flat-bottomed Petri dishes to prepare the dense film. The dense film was covered and dried at room temperature overnight for slow solvent evaporation. The dense film was then removed from PTFE Petri dish for further crosslinking.

The obtained PEBA/POSS membrane was photopolymerized by exposure to 318 nm UV light in a UV Crosslinker device (Model 13-245-221, Fisher Scientific) with an intensity of 12,000 mW/cm$^2$ for 180 seconds at 25° C. The obtained PEBA/XLMPOSS membrane was placed in a vacuum oven for further drying at 60° C. for at least 48 hours.

Similar procedures were repeated for the fabrication of PEBA/XLMPOSS crosslinked hybrid membranes consisted of 2.5 wt. %, 5 wt. %, 10 wt. %, and 20 wt. % loadings of methacryl-POSS cage mixtures. The resultant hybrid membranes had an average thickness of 30 to 70 μm. These membranes were processed for physical property characterization and gas permeation testing.

Comparative Membrane 1

Preparation of Poly(Amide-b-Ether) Membrane (Need PEBA Membrane)

The neat PEBA membrane was prepared using the solution casting technique. A sample of 0.8 g of dried Pebax® 1657 was dissolved in a mixture of 20 mL ethanol/deionized (DI) water (70/30 v/v). The reaction mixture was vigorously stirred at 85° C. under reflux for at least 6 hours to obtain a homogeneous solution. The obtained PEBA solution was placed at 50-60° C. to remove gas bubbles and then was poured within pre-heated (50 to 60° C.) polytetrafluoroethylene (PTFE) flat-bottomed Petri dishes to prepare the dense film. The dense film was dried at room temperature overnight with a cover for slow solvent evaporation, and then dried in a vacuum oven at 60° C. for 48 hr. Subsequent to that the membranes with an average thickness of 30 to 70 μm were easily peeled off the Petri dishes for permeation testing.

Comparative Membrane 2

Preparation of PEBA/Uncrosslinked Acrylo-POSS Hybrid Membranes (PEBA/POSS Membrane)

PEBA/POSS uncrosslinked hybrid membranes with different loadings (5-30 wt. %) of acrylo-POSS nanoparticles were prepared by the solution casting technique. In a typical film preparation procedure a sample of 0.8 g Pebax® 1657 from Arkema Inc. was dissolved in a mixture of 20 mL ethanol/deionized (DI) water (70/30 v/v). The reaction mixture was vigorously stirred at 85° C. under reflux for at least 6 hours to obtain a homogeneous solution. Subsequently, 0.04 g (5 wt. % of weight of Pebax® 1657) acrylo-POSS cage mixture $((C_6H_9O_2)_8(SiO_{1.5})_8$ having a molecular weight of 1322 g/mol) were dispersed and sonicated in 10 mL ethanol/deionized (DI) water (70/30 v/v). Then a quarter of the PEBA solution was added to the POSS/ethanol/DI water solution. The addition of PEBA solution acts as a primer to cover the functionalized POSS surface with polymer to help promote adhesion to the polymeric phase and to prevent particle aggregation during film preparation. Subsequently, stirring of the mixture was conducted for 0.5 h to ensure a homogenous dispersion of the particles. Then, the solution mixture was further sonicated for the same time duration. After that, the remaining PEBA solution was poured into the primed POSS/PEBA solution, and it was again sequentially stirred and sonicated for 0.5 h, each. The solution was placed at 50-60° C. to remove gas bubbles and then poured into a PTFE flat-bottomed Petri dish to prepare the dense film. The dense film was covered and dried at room temperature overnight for slow solvent evaporation. The dense film was then dried in a vacuum oven at 60° C. for 48 hours. The PEBA/POSS membranes had an average thickness of 30 to 70 μm. The membranes were easily peeled off the Petri dishes for permeation testing.

Similar procedures were repeated for the fabrication of PEBA/POSS membranes consisting of 10 wt. % and 30 wt. % loadings of acrylo-POSS cage mixture. The resultant hybrid membranes were processed for physical property characterization and gas permeation testing.

Results:

Membrane Physical Properties

The membrane physical properties were characterized mechanically via Universal Instron (Universal Instron 5969, temperature: 25° C., gauge: 1 inch and testing speed: 50 mm/min). Thermal analysis was conducted via differential scanning calorimetry (DSC) and thermogravimetric analysis (TGA) (Discovery DSC & TGA, TA Instruments, Each sample weight: 5-7 mg; temperature range from −150 to 100° C. at a scanning rate of 10° C./min.).

Figure 5A:
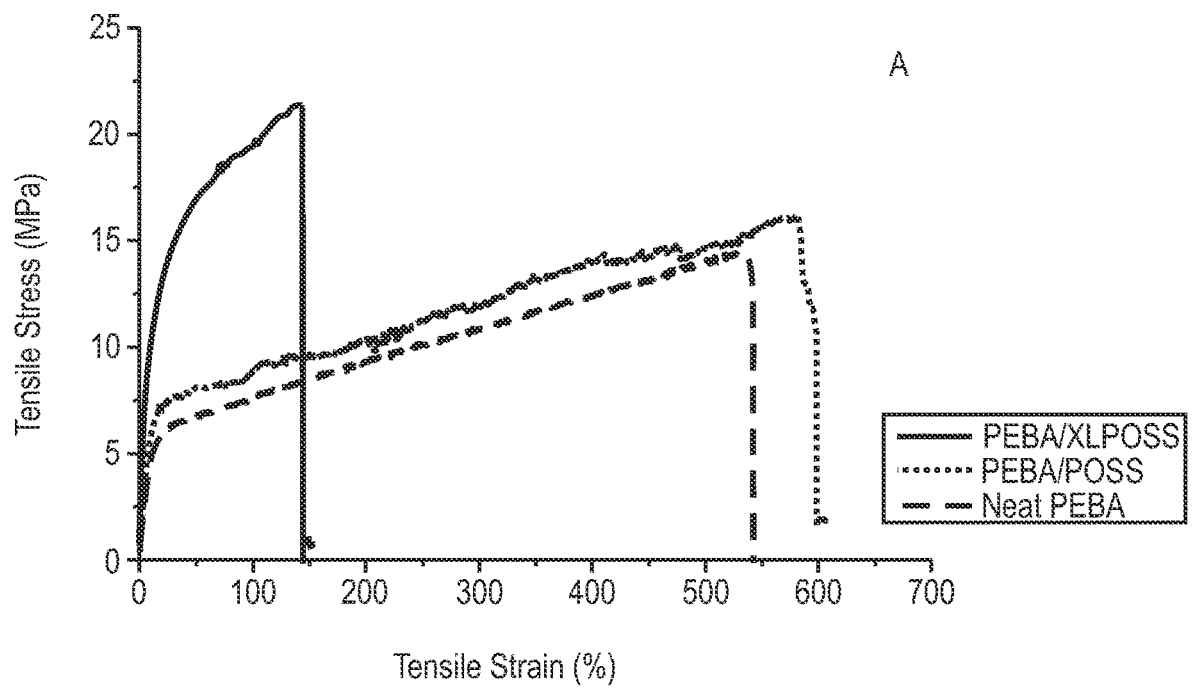
FIG. 5A is a plot comparing tensile stress-strain curves on membranes formed from neat PEBA, PEBA/POSS, and PEBA/XLPOSS.

FIG. 5A is a plot comparing tensile stress-strain curves on membranes formed from neat PEBA, PEBA/POSS, and PEBA/XLPOSS. In the example of FIG. 5A, the stress-strain curves of neat PEBA membrane, PEBA/XLPOSS crosslinked hybrid membrane and PEBA/POSS uncrosslinked hybrid membrane are shown in FIG. 5A, and the results, e.g., tensile stress, elongation and Young's modulus, are summarized in Table 1.

Results show that the PEBA/XLPOSS crosslinked hybrid membrane demonstrated significantly increase in mechanical strength (e.g. 69% and 80% increase in tensile strength and 33% and 68% increase in Young's modulus) compared to neat PEBA membrane and PEBA/POSS uncrosslinked hybrid membrane, respectively. This was presumably due to the formation of inter-connected network in PEBA matrix, leading to the tight packing of molecular chain. The increase in tensile strength is accompanied by a decrease in tensile strain as compared to neat PEBA and PEBA/POSS membranes.

Figure 5B:
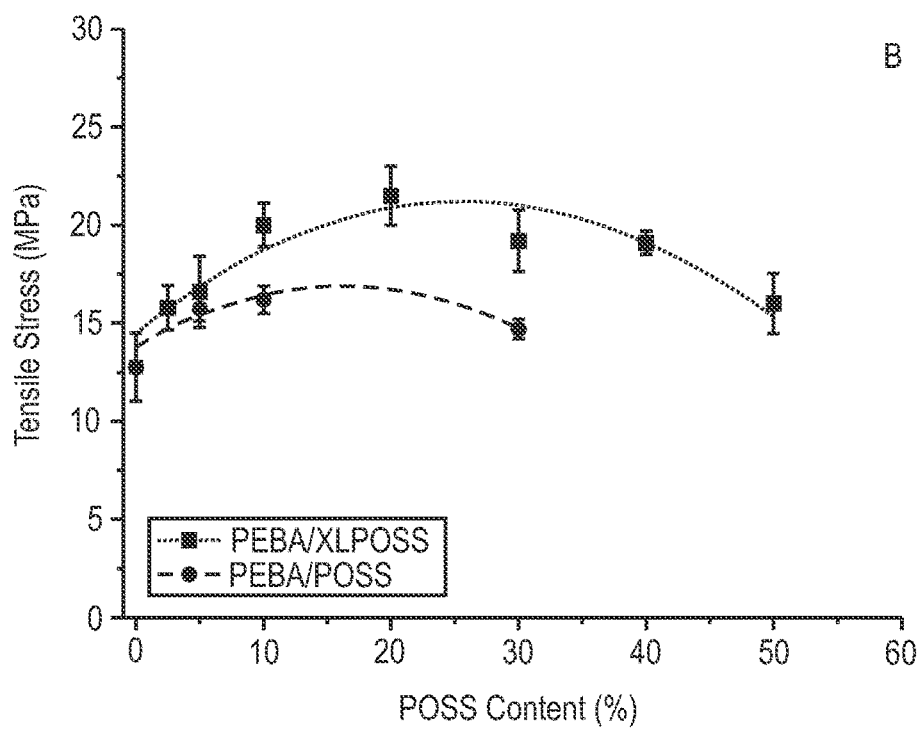
FIG. 5B is a plot comparing effect of POSS loading on membranes formed from PEBA/POSS and PEBA/XLPOSS.

FIG. 5B is a plot comparing effect of POSS loading on membranes formed from PEBA/POSS and PEBA/XLPOSS. As shown in FIG. 5B, a maximum tensile strength may be achieved at an intermediate POSS loading. In this example, the maximum tensile strength was achieved at a POSS content of 20 wt. %.

TABLE 1

Mechanical properties of neat PEBA, PEBA/POSS and PEBA/XLPOSS membranes

| Membranes | Tensile stress (MPa) | Tensile strain (%) | Young's Modulus (MPa) |
| --- | --- | --- | --- |
| Neat PEBA membrane | 12.7 + 1.7 | 470.7 + 16.8 | 89.0 + 4.7 |
| PEBA/POSS membrane | 16.2 + 0.7 | 580.2 + 50.0 | 95.5 + 9.0 |
| PEBA/XLPOSS membrane | 21.5 + 2.0 | 142.1 + 94.9 | 160.0 + 6.4 |

Thermal analysis, such as glass transition temperature ($T_g$), melting temperature ($T_m$) and crystallization temperature ($T_c$) of the membranes provides invaluable information about the modifications induced to the polymer host by the filler, as well as the thermal stability of the as-synthetized PEBA-POSS hybrid membranes. The DSC thermographs of PEBA-POSS hybrid membranes at different POSS loadings are shown in FIG. 6. Due to the multiphase-separated structure of PEBA, all the neat PEBA and its hybrid membranes display two endothermic peaks for melting points ($T_m$), the lower for polyether "soft" segment and the higher for polyamide "hard" segment.

Figure 6A:
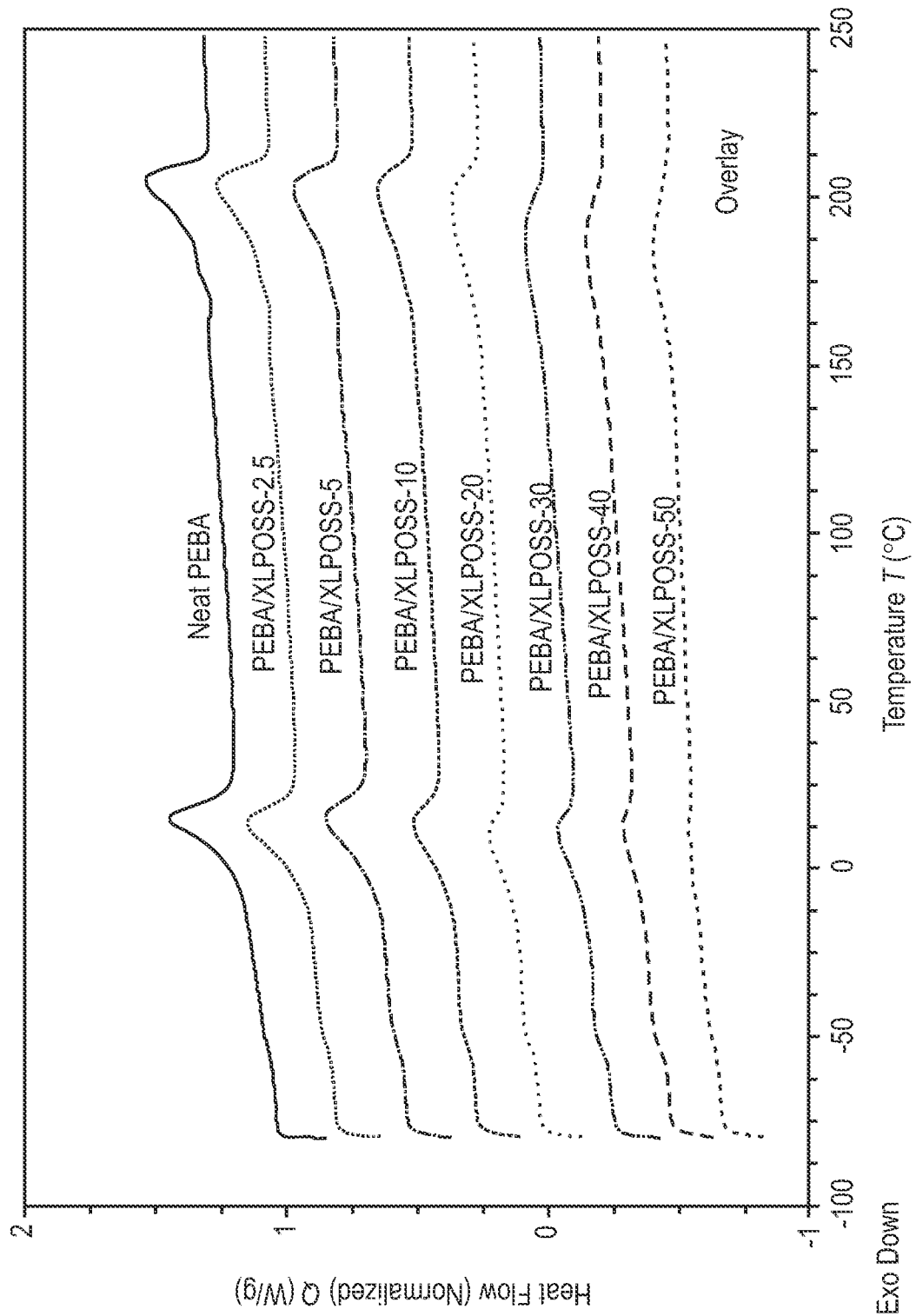
FIGS. 6A and 6B are plots of DSC thermographs, showing comparisons of second heating curves and first cooling curves of neat PEBA membrane and PEBA/XLPOSS hybrid membranes with different POSS loadings.
Figure 6B:
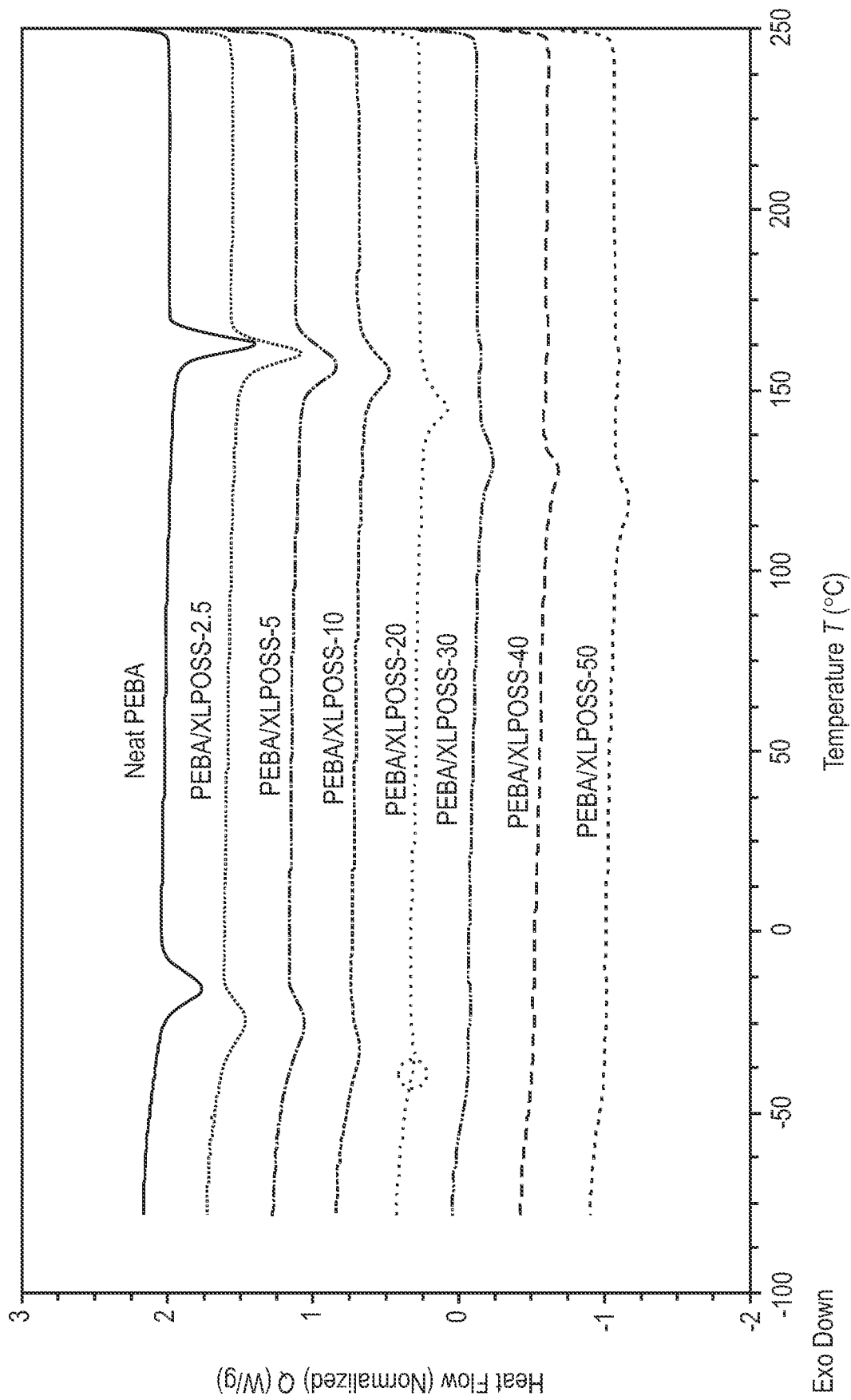

FIGS. 6A and 6B are plots of DSC thermographs, showing comparisons of second heating curves and first cooling curves, respectively, of neat PEBA membrane and PEBA/XLPOSS hybrid membranes with different POSS loadings.

FIG. 6A shows the effect of POSS loading in PEBA on the melting of polyether "soft" and polyamide "hard" blocks (second heating cycle of DSC thermographs). In the neat PEBA membrane, two characteristic melting endotherms were observed at 14.94° C. and 204.26° C., respectively, which are attributed to the melting of the polyether "soft" domains and polyamide "hard" blocks. The thermal transition (determined as the peak temperature, Tm) of both polyether and polyamide blocks does not seem to be affected by the incorporation of crosslinked POSS nanoparticles with loading <10 wt. %. However, addition of higher loading of POSS (>20 wt. %) into PEBA membrane matrix led to decrease in the melting (Tm) for both polyether "soft" and polyamide "hard" blocks. In particular, significant changes (34%, 20% and 69% decrease in Tm at 20 wt. %, 30 wt. % and 50 wt. % loading of POSS, respectively) were observed on Tm of the polyether "soft" block, compared to neat PEBA membrane. Smaller changes (3 wt. %, 9 wt. % and 11 wt. %) were seen in $T_m$ for polyamide "hard" blocks, compared to neat PEBA membrane.

Figure 7:
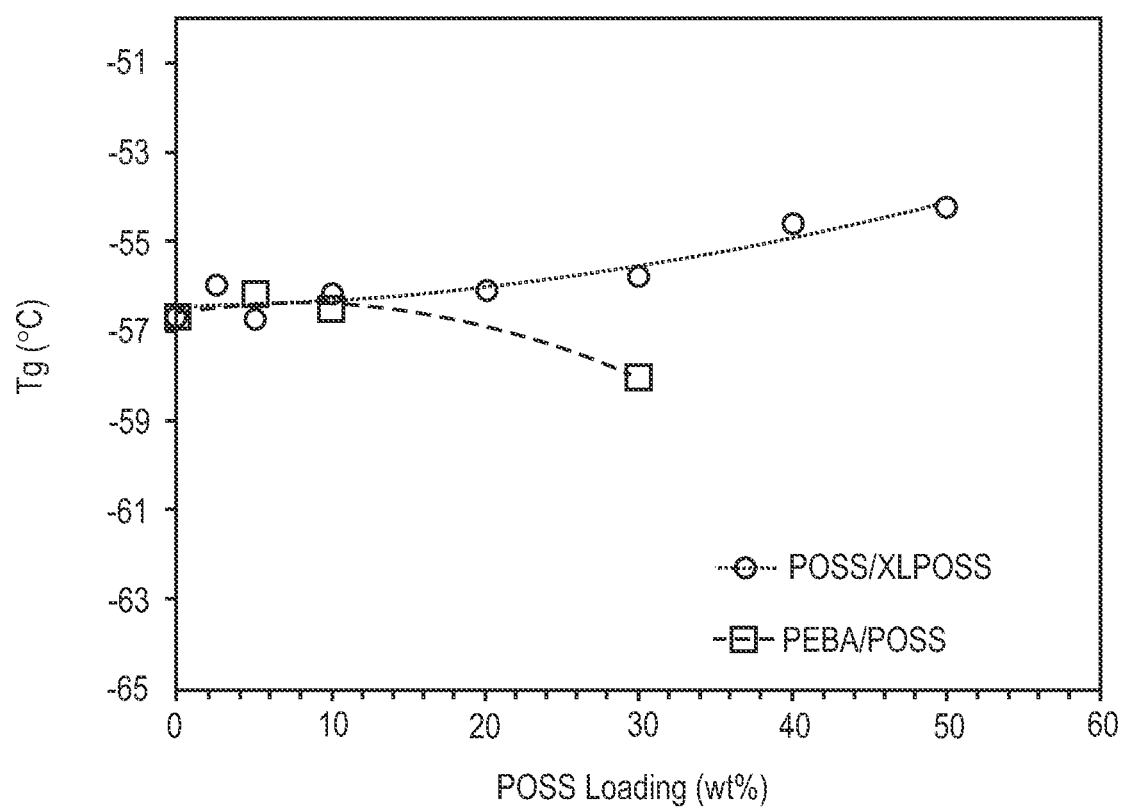
FIG. 7 is plot showing the effect of POSS loadings on the glass transition temperature ($T_g$) of PEBA/XLPOSS and PEBA/POSS membranes.

The effect of POSS loading in PEBA on the crystallization of polyether "soft" and polyamide "hard" blocks (first cooling cycle of DSC thermographs) is shown in FIG. 6B. It was observed that the Tm of polyether "soft" and polyamide "hard" blocks shifted to lower temperature due to incorporation of crosslinked POSS FIG. 7 is plot showing the effect of POSS loadings on the glass transition temperature ($T_g$) of PEBA/XLPOSS membranes and PEBA/POSS membranes. The plot shows the effect of POSS loading on the $T_g$ for PEBA/XLPOSS membranes. The $T_g$ is around −53° C., and corresponds to the polyether "soft" segment, as that of polyamide "hard" segment cannot be detected by DSC.

It was observed that no substantial influence was observed upon $T_g$ for lower POSS loading (~10 wt. %) in both PEBA/XLPOSS and PEBA/POSS hybrid membranes, indicating that the PEBA molecular chains are not significantly rigidified by POSS nanoparticles. However, the values for $T_g$ increased with the increase of crosslinked POSS loading in PEBA/XLPOSS hybrid membranes. Further crosslinking of POSS nanoparticles in PEBA matrix helps in reducing the chain mobility, thus resulting in an increase of $T_g$.

The increase of $T_g$ may contribute to the enhancement in membrane gas separation efficiency (selectivity). On the other hand, in the case of PEBA/POSS uncrosslinked hybrid membranes, the values for $T_g$ decreased with the increase of POSS loading. Decreased $T_g$ values in PEBA/POSS uncrosslinked hybrid membranes may be due to the POSS nanoparticles acting as plasticizer particles, which lowers the ordered chain arrangements of the polymer matrix resulting in higher fractional free volume (FFV), and leading to the enhancement in membrane gas transport (permeability).

In addition, compared to neat PEBA membrane, PEBA/XLPOSS membranes show slight decreased in onset temperature and degradation temperature ($T_d$), indicating that the PEBA/XLPOSS membranes retain good thermal stability (Table 2).

TABLE 2

Thermal stability of neat PEBA, PEBA/POSSS and PEBA/XLPOSS hybrid membranes

|  | Wt. % POSS | Onset temperature (° C.) | $T_d$ @5 wt. % (° C.) | $T_d$ @10 wt. % (° C.) |
|---|---|---|---|---|
| Neat PEBA | 0 | 432.66 | 372.67 | 390.68 |
| PEBA/POSS | 5 | 420.78 | 342.75 | 370.87 |
| PEBA/POSS | 10 | 417.81 | 345.12 | 371.13 |
| PEBA/POSS | 30 | 418.94 | 347.96 | 372.87 |
| PEBA/XLPOSS | 5 | 415.19 | 350.37 | 373.70 |
| PEBA/XLPOSS | 10 | 409.71 | 345.58 | 368.72 |
| PEBA/XLPOSS | 30 | 410.63 | 353.70 | 376.10 |

Membrane Permeation Testing

Figure 8:
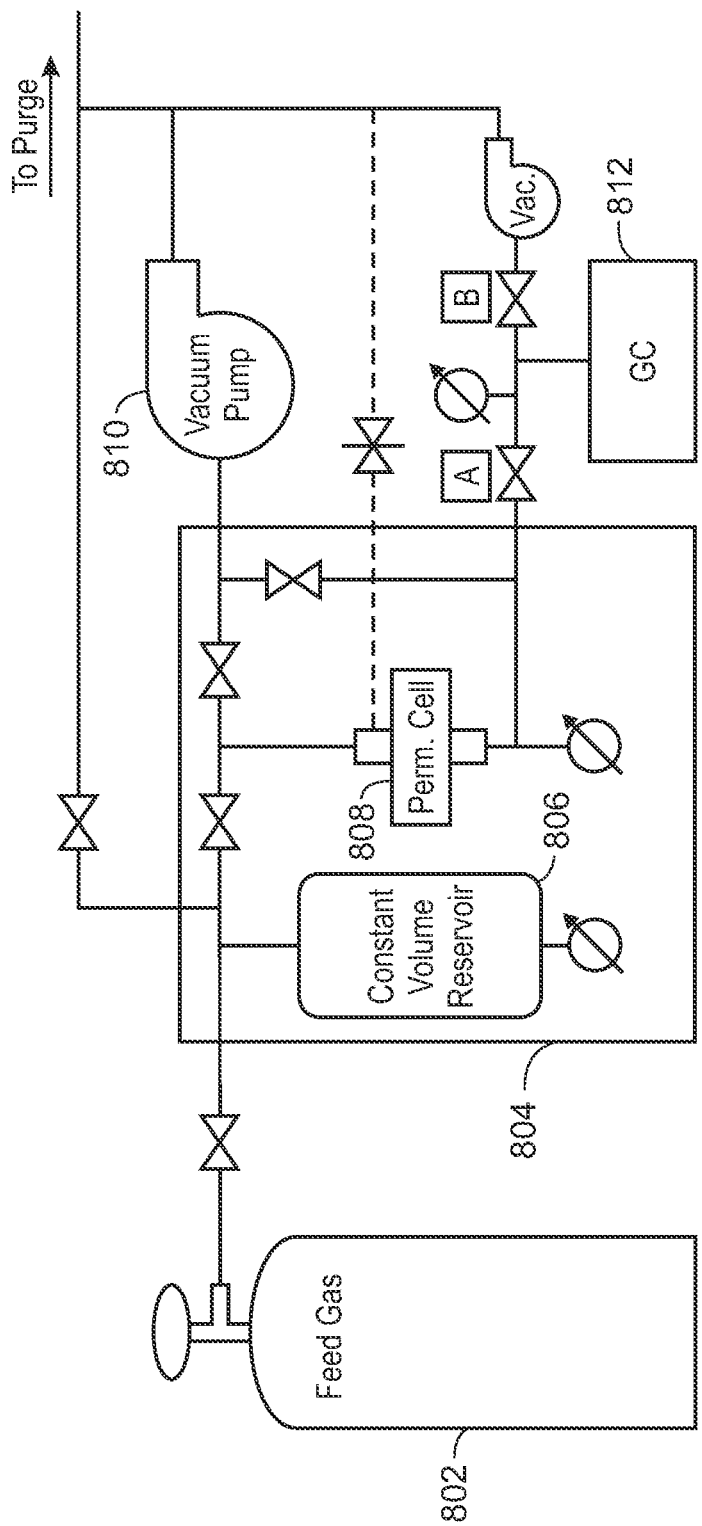
FIG. 8 is a simplified process flow diagram of a permeation apparatus used for measuring single gas and mixed gas permeation properties

FIG. 8 is a simplified process flow diagram of a permeation apparatus 800 used for measuring single gas and mixed gas permeation properties. The permeation apparatus 800 was custom-built. A feed gas tank 802 holds the gas or gas mixtures used for the tests. Multiple tanks coupled by a gas manifold may be used if sequential gas tests are desirable. A constant temperature enclosure or oven 804 holds the test apparatus, including a constant volume reservoir 806 and the permeation cell 808. The constant volume reservoir 806 ensures that the volume of gases on the membranes under test will remain constant during test parameter changes. The permeation cell 808 was a stainless-steel permeation cell with 47 mm disc filters, purchased from EMD Millipore. A vacuum pump 810 is used to clear the lines of undesirable gases, such as oxygen, nitrogen, and other atmospheric gases, in preparation for the testing. A gas chromatograph 812 is used to detect and quantify the amounts and ratios of gases in the feed to the permeation cell 808 and in the outlet from the permeation cell 808.

The gas permeation tests were performed in triplicate using a constant-volume, variable-pressure technique. An epoxy masked membrane sample of 5-20 mm in diameter was inserted and sealed in the permeation cell 808. The permeation apparatus 800 was completely evacuated for 1 hour before each test, using the vacuum pump 810. Pure gas permeability coefficients were measured at the temperature range of 20° C. to 50° C. and feed pressure range of 25 to 700 psi in the order of $CH_4$ followed by $CO_2$ to avoid swelling.

In addition to single gas tests, binary gas mixtures were used for permeation tests, including $CO_2/CH_4$ (20/80 vol/vol). Two sour gas feeds were used for tests. The first is termed a 5% sour gas mixture and included three components, 5% $H_2S$ and 3% $CO_2$ and 92% $CH_4$. The second sour gas feed, referred to herein as a 20% sour gas feed mixture, and includes five components, 10 vol. % $CO_2$, 20 vol. % $H_2S$, 10 vol. % $N_2$, 3 vol. % $C_2H_6$, and 57 vol. % $CH_4$.

Steady-state permeation was verified using the time-lag method, where 10 times the diffusion time lag was taken as the effective steady state. The upstream (feed) pressure and the downstream (permeate) pressure were measured using Baraton absolute capacitance transducers (MKS Instruments) and recorded using LabVIEW software. The permeate pressure was maintained below 100 torr. Mixed gas permeation was performed at 20° C. and feed pressure range of 200 psi to 800 psi with binary gas mixture and sour gas mixtures. A retentate stream was added for mixed gas tests and adjusted to 100 times the permeate flow rate to maintain less than 1% stage cut. The permeate gas was collected and then injected into the gas chromatograph 812, which was a Shimadzu gas chromatograph (GC-2014) to measure permeate composition. Permeate injections were performed at 95 torr. An Isco model 1000D syringe pump (Teledynelsco) was used to control the feed pressure.

The permeability coefficients of gas i, $P_i$, were calculated according to Equation 1. In equation 1, $dp_i/dt$ is the slope of the steady state pressure rise in the downstream, V is the downstream volume, R is the ideal gas constant, T is the temperature of the downstream, L is the membrane thickness (determined via JEOL 7100F scanning electron microscopy images of membrane cross sections), A is the membrane surface area (estimated using ImageJ image processing software), and $\Delta f_i$ is the partial fugacity difference across the membrane calculated using the Peng-Robinson equation. Selectivity, a $a_{i/j}$, was calculated as the ratio of permeability coefficients as expressed in Equation 2.

$$\alpha_{i/j} = \frac{P_i}{P_j} \quad (2)$$

Membrane Pure Gas Permeation Properties

Figure 9:
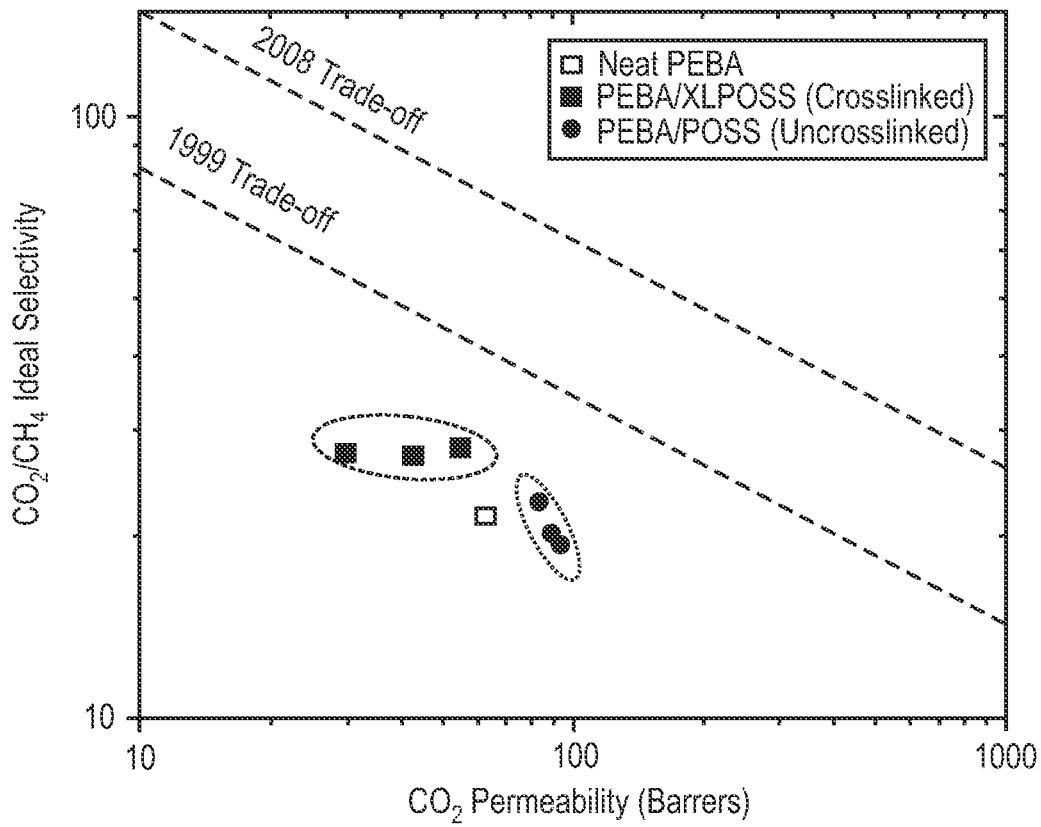
FIG. 9 is a plot of the tradeoff in membrane permeability and selectivity comparing neat PEBA, PEBA/XLPOSS (crosslinked) and PEBA/POSS (uncrosslinked) membranes in pure gas.

FIG. 9 is a plot of the tradeoff in membrane permeability and selectivity comparing neat PEBA, PEBA/XLPOSS (crosslinked) and PEBA/POSS (uncrosslinked) hybrid membranes in pure gas. In the early 1990s, a research survey determined that polymers with a high selectivity have a low permeability and that the opposite is also true, that materials with a low selectivity have a high permeability. This provides the plot line labeled as "1991 trade-off." The research survey was updated to reflect advancements in membrane technology in an article in 2008, providing the plot line labeled "2008 trade-off." See L. M. Robeson, "The Upper Bound Revisited," Journal of Membrane Science 320, 390-400 (2008)).

The tests were performed at 20° C. and 100 psi. Ideal transport properties, measured by pure gas permeation, provide preliminary material observations and comparisons. The results of pure gas permeation results are shown in FIG. 9 and Table 3.

TABLE 3

Single gas permeation results for a neat PEBA membrane, a PEBA/POSS uncrosslinked hybrid membrane, a PEBA/XLPOSS crosslinked hybrid membrane, and a PEBA/XLPOSS crosslinked hybrid membrane for $CO_2/CH_4$ separation

| Membranes | $P_{CO2}$ (Barrer) | $P_{CH4}$ (Barrer) | $\alpha_{CO2/CH4}$ |
|---|---|---|---|
| Neat PEBA Membrane | 60.59 | 2.61 | 23.21 |
| PEBA/POSS Membrane | 89.23 | 4.43 | 20.14 |
| PEBA/XLPOSS Membrane | 55.58 | 1.98 | 28.04 |
| PEBA/XLMPOSS Membrane | 66.62 | 2.90 | 22.99 |

Tested at 25° C. and feed pressure of 100 psi

Figure 10:
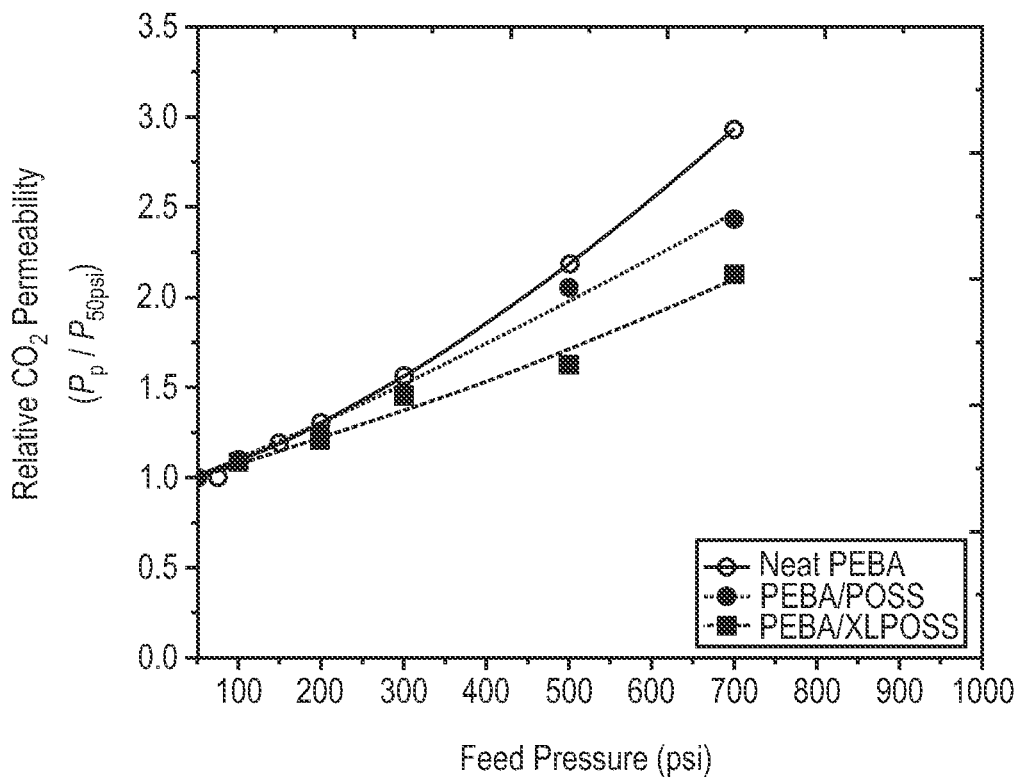
FIG. 10 is a plot comparing the relative $CO_2$ permeability of a neat PEBA membrane, a PEBA/POSS membrane, and a PEBA/XLPOSS membrane vs. feed pressure (50-700 psi) tested under single gas

FIG. 10 is a plot comparing the relative $CO_2$ permeability of a neat PEBA membrane, a PEBA/POSS membrane, and a PEBA/XLPOSS membrane vs. feed pressure (50-700 psi) tested under a single gas. As can be seen from FIG. 10, the PEBA/XLPOSS membranes show decreased $CO_2$ permeability, but enhanced $CO_2/CH_4$ selectivity under the same testing conditions compared to neat PEBA membranes. This is presumably due to the reduction of chain packing in the PEBA matrix after UV crosslinking of POSS nanoparticle. However, PEBA/POSS membranes show increased $CO_2$ permeability, but decreased $CO_2/CH_4$ selectivity compared to neat PEBA membrane. This may be due to the increase in accessible free volume disrupting the polymer chain packing with incorporation of uncrosslinked POSS nanoparticles in membrane matrix. In one example (Table 3), a PEBA/XLPOSS membrane had a $CO_2/CH_4$ selectivity with 28.04, compared to PEBA/POSS uncrosslinked hybrid membrane with 20.14, and neat PEBA membrane with 23.21. In addition, the PEBA/XLPOSS crosslinked hybrid membranes exhibited decreased $CO_2$ permeability (55.58 Barrer) compared to neat PEBA membrane (60.59 Barrer) and PEBA/POSS uncrosslinked hybrid membrane (89.23 Barrer).

Furthermore, PEBA/XLPOSS membranes have increased resistance to plasticization at high feed pressure compared to neat PEBA membrane and PEBA/POSS membrane. As can be seen from FIG. 10, the neat PEBA membranes exhibited 219% and 293% increase in $CO_2$ permeability at 500 psi and 700 psi, respectively, compared to that at 50 psi. While PEBA/XLPOSS membrane show about 163% and 213% increase in $CO_2$ permeability at 500 psi and 700 psi, respectively, compared to that at 50 psi. This may be due to the incorporation of the network of crosslinked POSS nanoparticles in the PEBA membrane matrix. Without the crosslinking of the POSS nanoparticles, the PEBA/POSS membranes show decreased resistance to plasticization than that of the PEBA/XLPOSS membranes, but better than that of the neat PEBA membranes under the same feed pressure.

Membrane Binary Mixture Permeation Properties

Ideal transport properties measured in pure gas may be poor indicators of membrane performance in high pressure mixed gas feeds. For example, interactions between gas species A and the membrane may influence the permeation of gas species B through the membrane.

Figure 11:
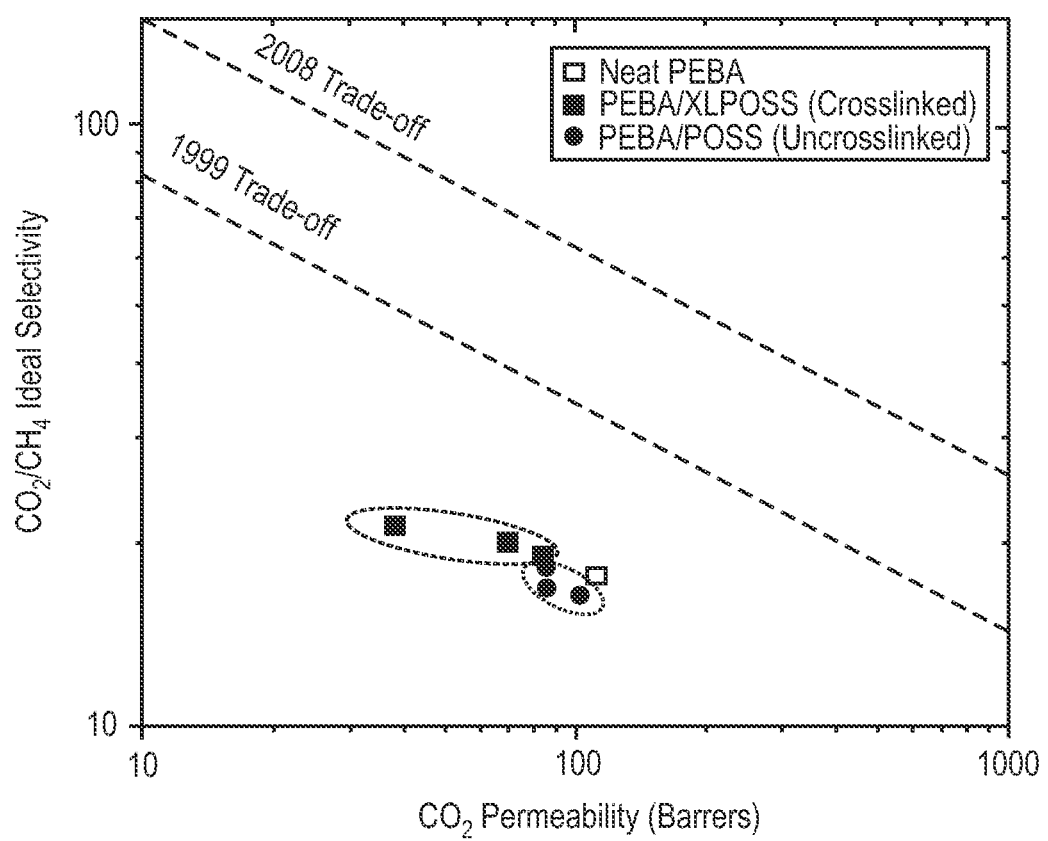
FIG. 11 is a plot of the tradeoffs in Membrane permeability-selectivity trade-off ($CO_2/CH_4$ vs. $CO_2$) comparison of neat PEBA, PEBA/XLPOSS (crosslinked) and PEBA/POSS (uncrosslinked) membranes in $CO_2/CH_4$ (20/80 vol/vol) binary gas mixture (tested at 25° C. and 800 psi)

FIG. 11 is a plot of the comparison of permeability-selectivity trade-offs ($CO_2/CH_4$ vs. $CO_2$) of neat PEBA, PEBA/XLPOSS membranes, and PEBA/POSS membranes in $CO_2/CH_4$ (20/80 vol/vol) binary gas mixture (tested at 25° C. and 800 psi). The plot shows the binary gas mixture ($CO_2/CH_4$ 20 vol/80 vol) permeation properties of neat PEBA membrane and both hybrid membranes at feed pressure of 800 psi. The results show that the PEBA/XLPOSS membranes show decreased $CO_2$ permeability, but improved $CO_2/CH_4$ mixed gas selectivity compared to neat PEBA membranes. However, PEBA/POSS membranes show both decreased $CO_2$ permeability and $CO_2/CH_4$ mixed gas selectivity compared to neat PEBA membranes. In one example (Table 4), a PEBA/XLPOSS membrane had a $CO_2/CH_4$ selectivity of 20.24, compared to a PEBA/POSS membrane of 16.70, and a neat PEBA membrane of 17.86. However, the PEBA/XLPOSS membrane had decreased $CO_2$ permeability (69.90 Barrer) compared to the PEBA/POSS membrane (85.60 Barrer), and the neat PEBA membrane (112.3 Barrer).

TABLE 4

Binary gas mixture permeation results for neat PEBA membrane, PEBA/POSS uncrosslinked hybrid membranes and PEBA/XLPOSS crosslinked hybrid membranes for $CO_2/CH_4$ separation

| Membranes | $P_{CO2}$ (Barrer) | $P_{CH4}$ (Barrer) | $\alpha_{CO2/CH4}$ |
|---|---|---|---|
| Neat PEBA Membrane | 112.30 | 6.29 | 17.86 |
| PEBA/POSS Membrane | 85.60 | 5.13 | 16.70 |
| PEBA/XLPOSS Membrane | 69.90 | 3.45 | 20.24 |

Tested at 25° C. and feed pressure of 800 psi, POSS loading: 10 wt. %

Figure 12:
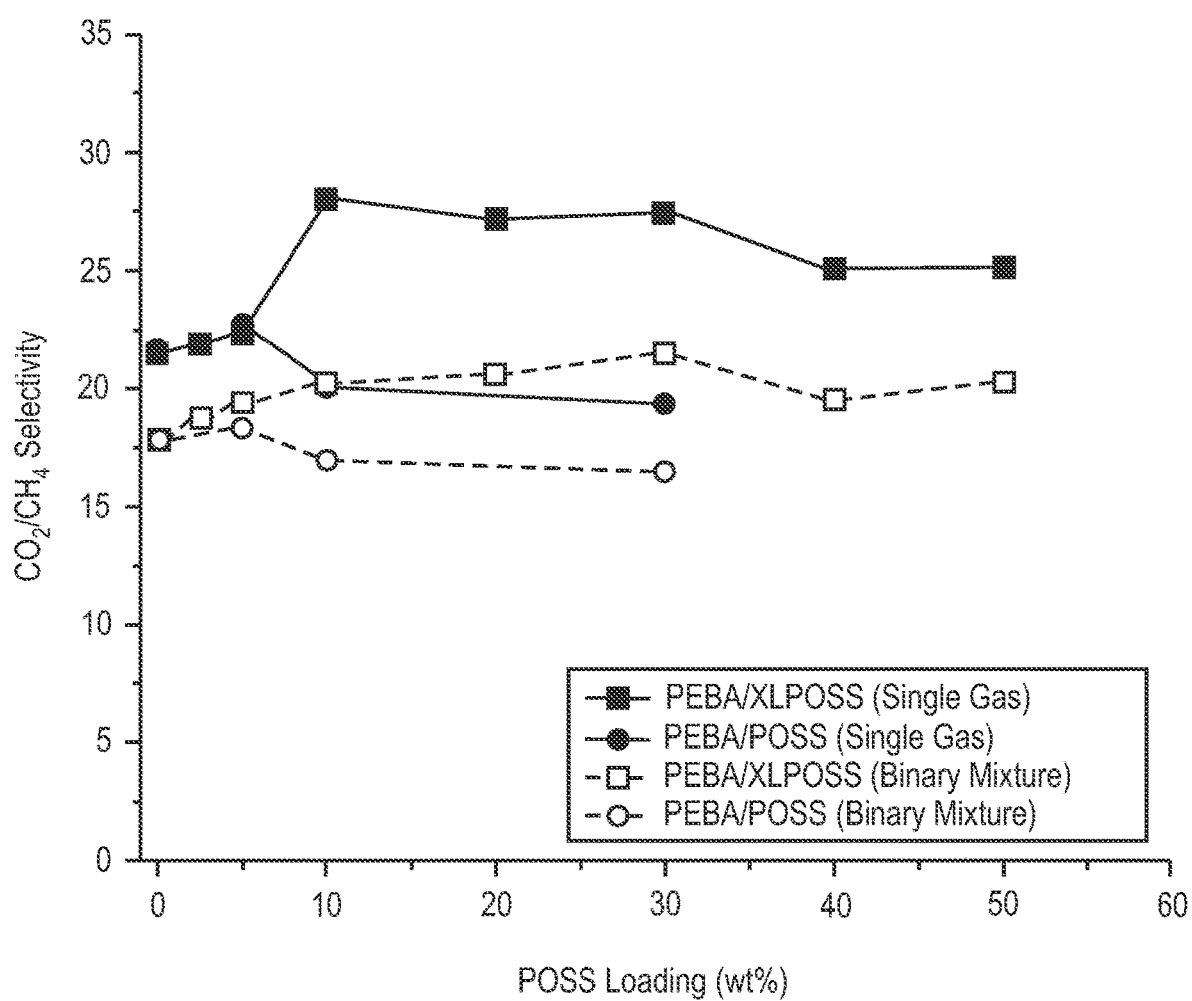
FIG. 12 is a plot of the effect of POSS loading on $CO_2/CH_4$ selectivities of PEBA/XLPOSS membranes and PEBA/POSS membranes.

FIG. 12 is a plot of the effect of POSS loading on $CO_2/CH_4$ selectivities of PEBA/XLPOSS membranes and PEBA/POSS membranes. In the plot of FIG. 12, the single gas results for PEBA/XLPOSS membranes are shown as solid squares and the binary gas mixture results for PEBA/XLPOSS membranes are shown as open squares. The single gas results for PEBA/POSS membranes are shown as solid circles and the binary gas mixture results for PEBA/POSS membranes are shown as open circles. The test conditions for the single gas were 25° C. and 100 psi. The test conditions for the binary gas mixtures were 25° C. and 800 psi.

As shown in FIG. 12, the loading of POSS nanoparticles has a significant influence on the membrane separation performance. Under pure gas testing, the PEBA/XLPOSS membranes (solid squares) show increased selectivity for $CO_2/CH_4$ up to POSS loading of 10 wt. %, which decreases slightly at higher POSS loading. However, the $CO_2/CH_4$ selectivity for PEBA/POSS membranes (solid circles) decreased with the increase of POSS concentration. In one example, the PEBA/XLPOSS membranes have $CO_2/CH_4$ selectivity values of 22.4, 28.0, 27.4, at POSS concentrations of 5%, 10% and 30%, respectively. In comparison, the PEBA/POSS membranes have $CO_2/CH_4$ selectivity values of 22.7, 20.1 and 19.4, at POSS concentration of 5%, 10% and 30%, respectively.

Similar trends were observed for PEBA/POSS membranes (open circles) and PEBA/XLPOSS membranes (open squares) under binary gas mixture. However, compared to pure gas, the hybrid membranes (both cross-linked and uncross-linked) show lower separation performance under the same testing conditions in binary gas mixture at all levels of POSS loading, which may be due to the competition of gas species ($CO_2$ and $CH_4$) in the feed.

Membrane Sour Mixed Gas Permeation Properties

To allow for a relatively straightforward analysis of the sour gas transport properties, mixed sour gas permeation testing for PEBA/XLPOSS membranes was performed using 5% sour gas mixture containing three components, 5 vol. % $H_2S$ and 3 vol. % $CO_2$ and 92 vol. % $CH_4$, in a feed pressure range of 200-800 psi at 25° C.

Figure 13A:
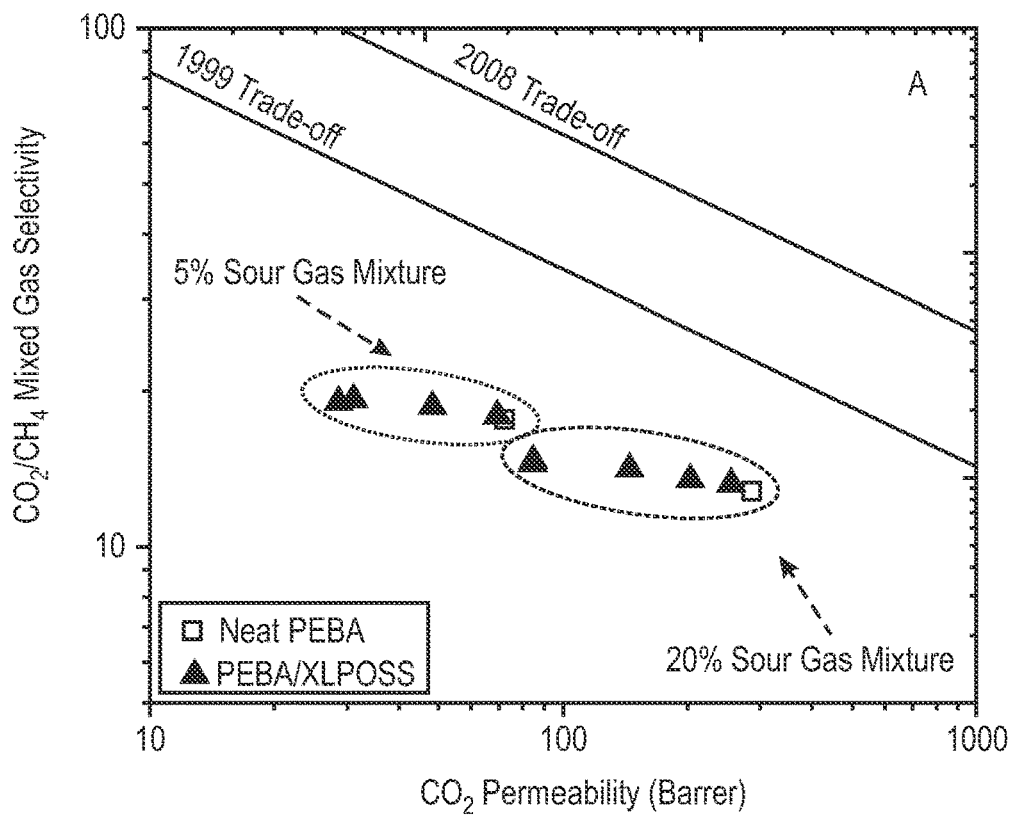
FIGS. 13A and 13B are plots of the tradeoffs of permeability versus selectivity for $CO_2/CH_4$ vs. $CO_2$ and $H_2S/CH_4$ vs. $H_2S$ comparing neat PEBA and PEBA/XLPOSS membranes.
Figure 13B:
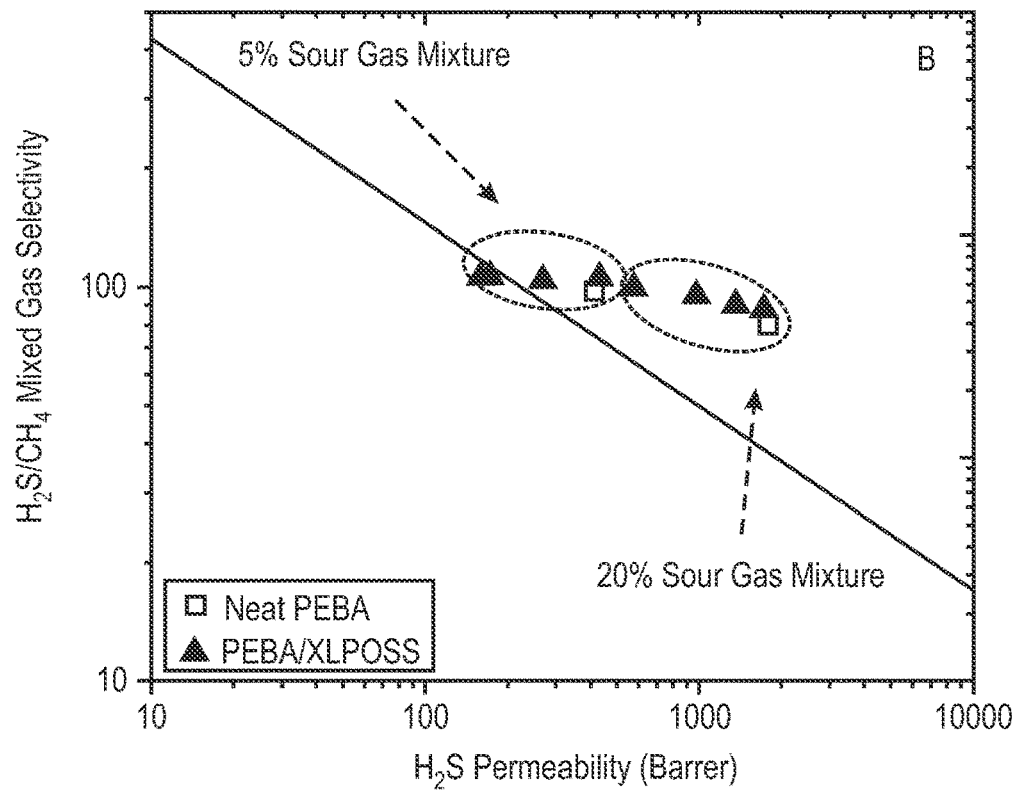

FIGS. 13A and 13B are plots of the tradeoffs of permeability versus selectivity for $CO_2/CH_4$ vs. $CO_2$ and $H_2S/CH_4$ vs. $H_2S$ comparing neat PEBA membranes and PEBA/XLPOSS membranes. The tests were run at 5% and 20% sour gas mixtures tested at 25° C. and 800 psi. FIG. 13A shows the permeability ($CO_2$ or $H_2S$)-selectivity ($CO_2/CH_4$ or $H_2S/CH_4$) and trade-off trend measure at 800 psi under the 5% sour gas mixture. The results show that PEBA/XLPOSS membranes have improved separation performance in sour gas mixtures (4-13% increase in $CO_2/CH_4$ selectivity, and 3-9% increase in $H_2S/CH_4$ mixed gas selectivity), compared to neat PEBA membranes. In one example (Table 5), the PEBA/XLPOSS membranes with the addition of POSS loadings of 10 wt. %, 20 wt. % and 30 wt. % had $CO_2/CH_4$ mixed gas selectivities of 17.82, 18.69 and 19.29, respectively, and $H_2S/CH_4$ mixed gas selectivities of 101.00, 104.48 and 106.86, respectively. By comparison the neat PEBA membrane had a $CO_2/CH_4$ mixed gas selectivity of 17.14 and a $H_2S/CH_4$ mixed gas selectivity of 97.92.

In natural gas processing, multicomponent sour gas mixtures are likely to be present. Other gases, such hydrocarbons are very common in natural gas wells and can plasticize polymer membranes. To this end, permeation studies were run using a 20% sour gas mixture to provide a more realistic measure of actual membrane. As described herein the 20% sour gas mixture includes 5-components, 10 vol. % $CO_2$, 20 vol. % $H_2S$, 10 vol. % $N_2$, 3 vol. % $C_2H_6$, and 57 vol. % $CH_4$ were used performance in applications where gas reservoir $H_2S$ content is quite high.

FIG. 13B shows the $CO_2$ and $H_2S$ transport properties from 20 vol. % $H_2S$ sour mixed gas feeds at feed pressure up to 800 psi. The results show that PEBA/XLPOSS membranes have improved performance in sour gas separation (5.5-15% increase in $CO_2/CH_4$ selectivity, and 13-25% increase in $H_2S/CH_4$ mixed gas selectivity) compared to neat PEBA membranes. As anticipated, the gas permeabilities of $CO_2$ and $H_2S$ for PEBA/XLPOSS membranes increased in the more concentrated $H_2S$ stream (20%) because of the higher content of plasticization gases, compared to less concentrated $H_2S$ stream (5%). However, the mixed gas selectivities for $CO_2/CH_4$ and $H_2S/CH_4$ dropped as much as 24% and 10%, respectively. In one example (Table 6), PEBA/XLPOSS membranes having POSS loadings of 10 wt. %, 20 wt. % and 30 wt. % had $CO_2/CH_4$ mixed gas selectivities of 13.50, 14.16 and 14.69, respectively, and $H_2S/CH_4$ mixed gas selectivities of 90.44, 95.57 and 99.91, respectively. By comparison, the neat PEBA membrane had a $CO_2/CH_4$ mixed gas selectivity of 17.14 and a $H_2S/CH_4$ mixed gas selectivity of 97.92, under the 20% $H_2S$ sour gas feed.

TABLE 5

5% sour gas permeation properties for neat PEBA, PEBA/POSS hybrid and PEBA/XLPOSS hybrid membranes

| Membranes | Permeability (Barrer) | | Selectivity | |
|---|---|---|---|---|
| | $PCO_2$ | $PH_2S$ | $\alpha CO_2/CH_4$ | $\alpha H_2S/CH_4$ |
| Neat PEBA Membrane | 72.12 | 412.83 | 17.14 | 97.92 |
| PEBA/XLPOSS Membrane | 69.40 | 393.60 | 17.82 | 101.00 |
| | 48.20 | 269.60 | 18.69 | 104.48 |
| | 31.10 | 172.50 | 19.29 | 106.86 |

Sour gas composition: 3 vol. % $CO_2$/5 vol. % $H_2S$/92 vol. % $CH_4$
Feed temperature: 25° C.; feed pressure: 800 psi

TABLE 6

20% sour gas permeation properties for neat PEBA, PEBA/POSS hybrid and PEBA/XLPOSS hybrid membranes

| Membranes | Permeability (Barrer) | | Selectivity | |
|---|---|---|---|---|
| | $PCO_2$ | $PH_2S$ | $\alpha CO_2/CH_4$ | $\alpha H_2S/CH_4$ |
| Neat PEBA Membrane | 285.85 | 1789.67 | 12.79 | 80.08 |
| PEBA/XLPOSS Membrane | 203.00 | 1360.00 | 13.50 | 90.44 |
| | 144.70 | 976.20 | 14.16 | 95.57 |
| | 84.80 | 576.50 | 14.69 | 99.91 |

Figure 14A:
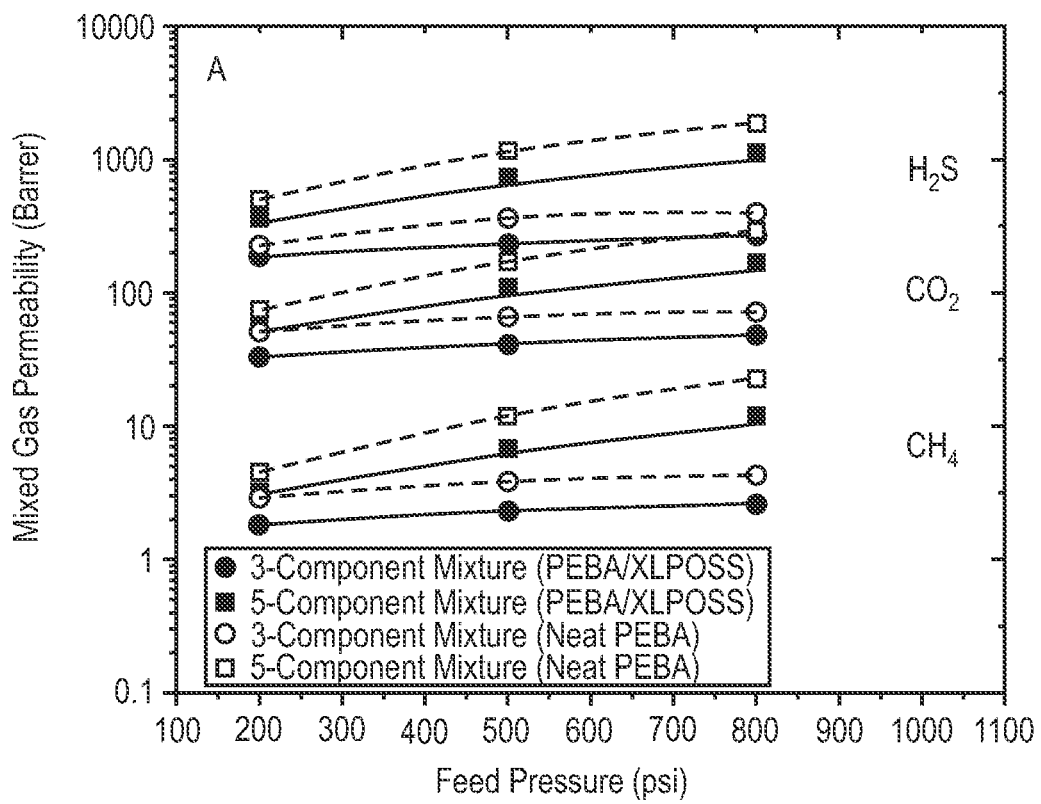
FIGS. 14A and 14B are plots of the effects of feed pressure on $CO_2$, $H_2S$ and $CH_4$ permeabilities and $CO_2/CH_4$ and $H_2S/CH_4$ selectivities comparing PEBA/XLPOSS membranes and neat PEBA membranes.
Figure 14B:
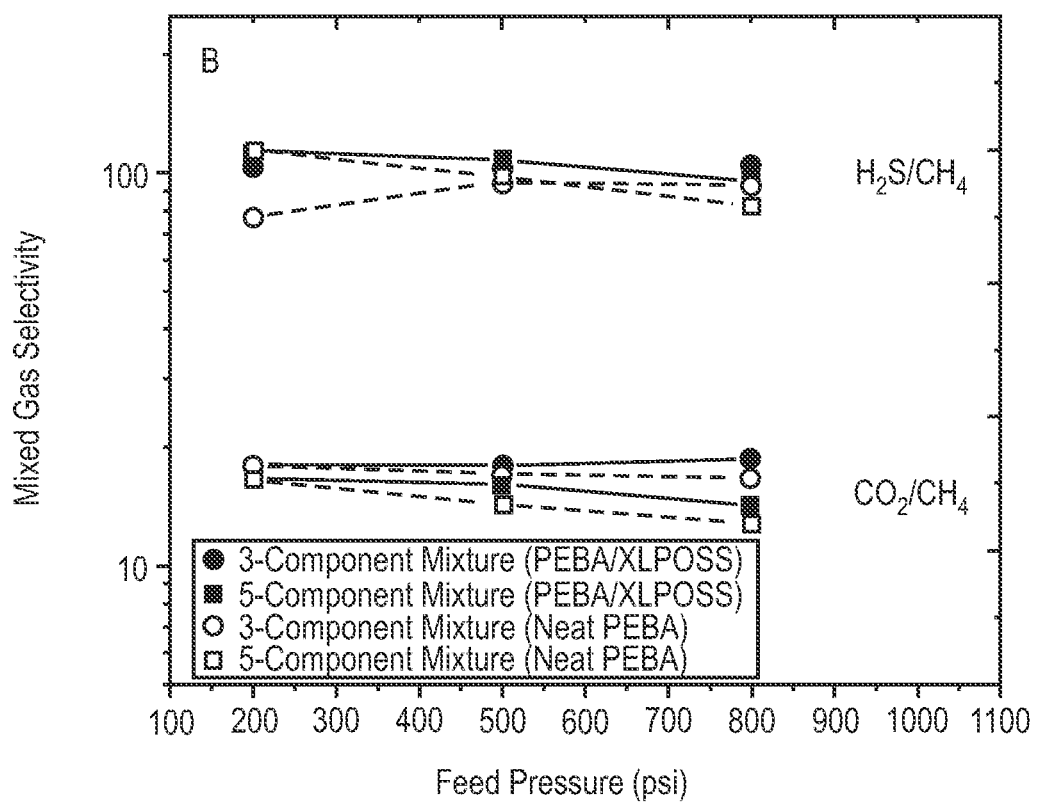

Sour gas composition: 10 vol. % $CO_2$/20 vol. % $H_2S$/10 vol. % $N_2$/3 vol. % $C_2H_6$/57 vol. % $CH_4$
Feed temperature: 25° C.; feed pressure: 800 psi FIGS. 14A and 14B are plots of the effects of feed pressure on $CO_2$, $H_2S$ and $CH_4$ permeabilities and $CO_2/CH_4$ and $H_2S/CH_4$ selectivities comparing PEBA/XLPOSS membranes and neat PEBA membranes. FIG. 14A is a plot showing the influence of feed pressure on the permeabilities of $CO_2$, $H_2S$ and $CH_4$ for PEBA/XLPOSS membranes (solid symbols) and neat PEBA (open symbols). The feed gases used included a three component sour gas feed that included 5% $H_2S$ (circles) and a five component sour gas feed that include 20% $H_2S$ (squares). The five component feed included 10 vol. % $CO_2$, 20 vol. % $H_2S$, 10 vol. % $N_2$, 3 vol. % $C_2H_6$, and 57 vol. % $CH_4$, and the three component feed included 5% $H_2S$ and 3% $CO_2$ and 92% $CH_4$. The tests were run at a range of the gas pressures including 200 psi, 500 psi, and 800 psi, and a temperature of 25° C.

The same trends are observed for comparisons of PEBA/XLPOSS membranes and neat PEBA membranes. The permeabilities of $CO_2$, $H_2S$ and $CH_4$ increased as the pressure was raised from 200 psi to 800 psi (FIG. 14A) under both 5% and 20% sour gas feeds. However, the gas permeabilities increased in the more concentrated $H_2S$ stream (20%) because of the higher content of plasticization gases, compared to less concentrated $H_2S$ stream (5%) under the same feed pressure. For example, the $CO_2$, $H_2S$ and $CH_4$ permeabilities at feed pressures of 200 psi, 500 psi, and 800 psi under 20% $H_2S$ gas feed increased by 214%, 211% and 272%, respectively. By comparison the $CO_2$, $H_2S$ and $CH_4$ permeabilities at feed pressures of 200 psi, 500 psi, and 800 psi under 5% $H_2S$ gas feed increased by 46%, 44% and 44%, respectively.

FIG. 14B is a plot showing the $CO_2/CH_4$ and $H_2S/CH_4$ selectivities PEBA/XLPOSS (solid symbol) and neat PEBA (open symbol) membranes for a 5% $H_2S$ (circles) and 20% $H_2S$ (square) sour gas feeds at 25° C. On the other hand, the $CO_2/CH_4$ and the $H_2S/CH_4$ mixed gas selectivities remained relatively constant under the 5% $H_2S$ gas feed as feed pressure increased from 200 psi to 800 psi, while the $CO_2/CH_4$ and the $H_2S/CH_4$ mixed gas selectivities dropped as much as 25% over the same feed pressure under 20% $H_2S$ gas feed. Thus, under the same testing conditions, e.g., feed pressure and $H_2S$ concentration, the PEBA/XLPOSS membranes demonstrate enhanced $CO_2/CH_4$ and $H_2S/CH_4$ mixed gas selectivities, but decreased $CO_2$ and $H_2S$ permeabilities.

Figure 15A:
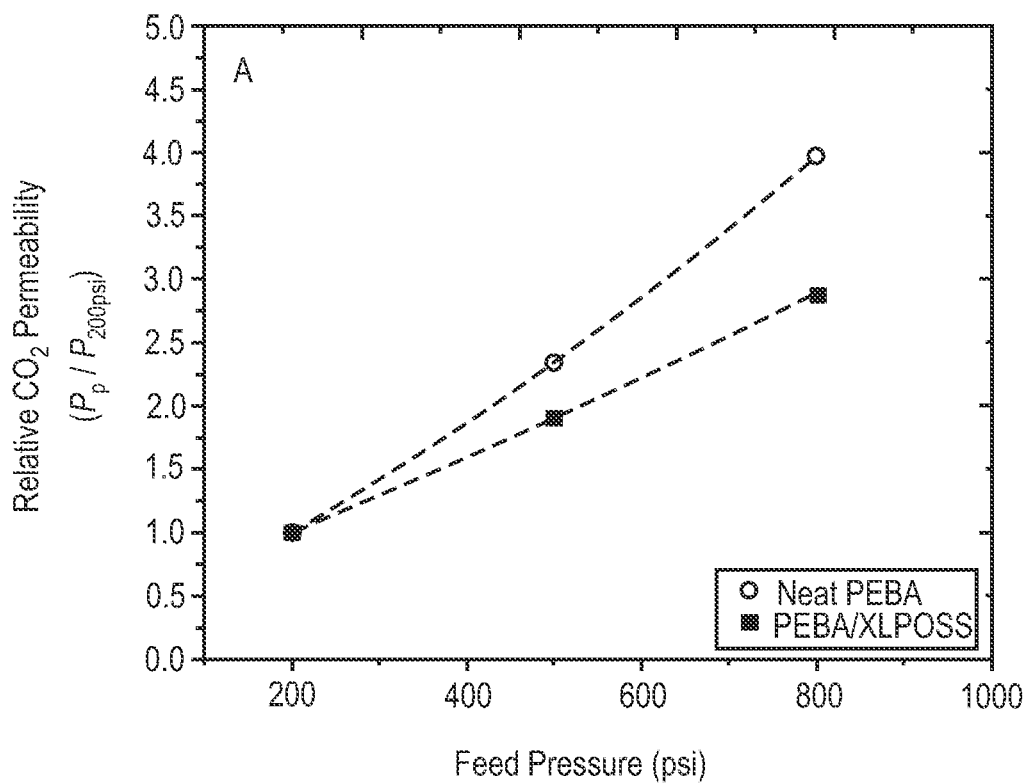
FIGS. 15A and 15B are plots comparing relative $CO_2$ permeability and relative $H_2S$ permeability of a neat PEBA membrane with a PEBA/XLPOSS membranes vs. feed pressure.
Figure 15B:
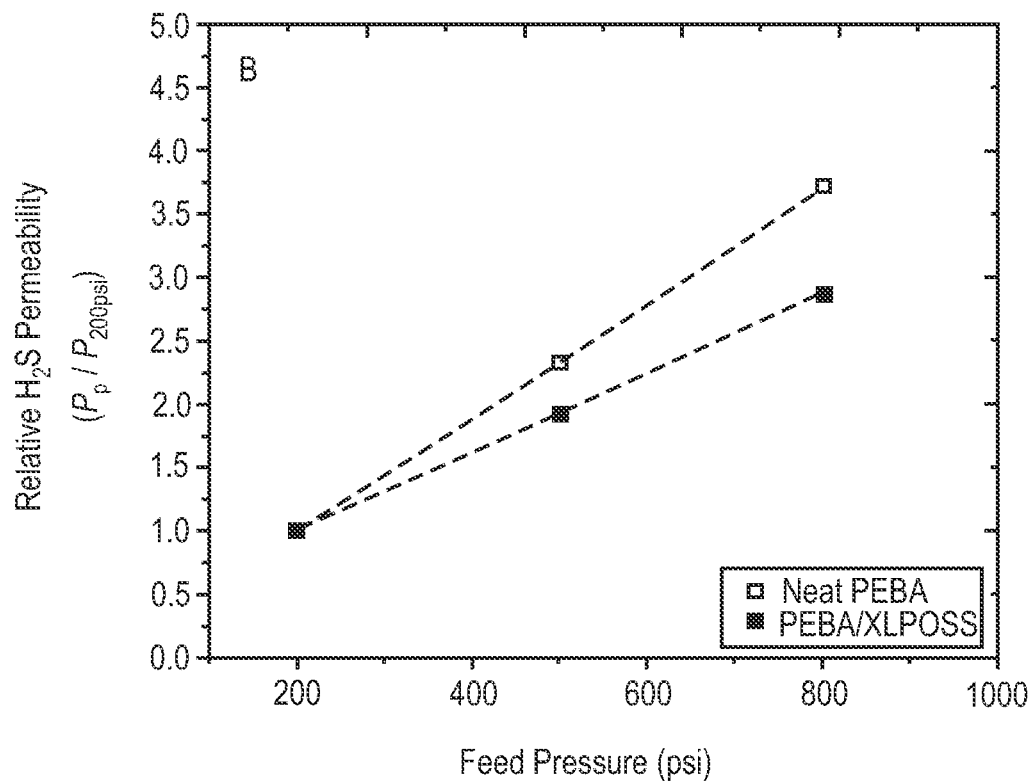

FIGS. 15A and 15B are plots comparing relative $CO_2$ permeability and relative $H_2S$ permeability of a neat PEBA membrane with a PEBA/XLPOSS membrane vs. feed pressure. The tests were run using a five component mixture (10 vol. % $CO_2$, 20 vol. % $H_2S$, 10 vol. % $N_2$, 3 vol. % $C_2H6$, and 57 vol. % $CH_4$) at a range of the gas pressures including 200 psi, 500 psi, and 800 psi, and a temperature of 25° C.

Relative permeability is the permeability at a given feed pressure divided by its permeability at 200 psi. In one example, a neat PEBA membrane exhibited a 134% and a 298% increase in $CO_2$ and a 132% and a 271% increase in $H_2S$ permeabilities under the feed pressure of 500 psi and 800 psi, respectively, compared to that under feed pressure of 200 psi. By comparison, the PEBA/XLPOSS membrane showed only about a 97% and a 188% increase in $CO_2$ and a 93% and a 186% increase in $H_2S$ permeabilities under a feed pressure of 500 psi and 800 psi, respectively, compared to that under a feed pressure of 200 psi. This may be attributed to the incorporation of crosslinked POSS nanoparticles in PEBA membrane matrix resulting in the reduction of chain packing and mobility.

Furthermore, PEBA/XLPOSS membranes demonstrate significantly enhancement in resistance to plasticization from both $CO_2$ and $H_2S$ in the more concentrated $H_2S$ stream (20%) compared to neat PEBA membranes. The change of $CO_2$ and $H_2S$ relative permeabilities with the increase of the feed pressure is shown in FIG. 15.

Figure 16:
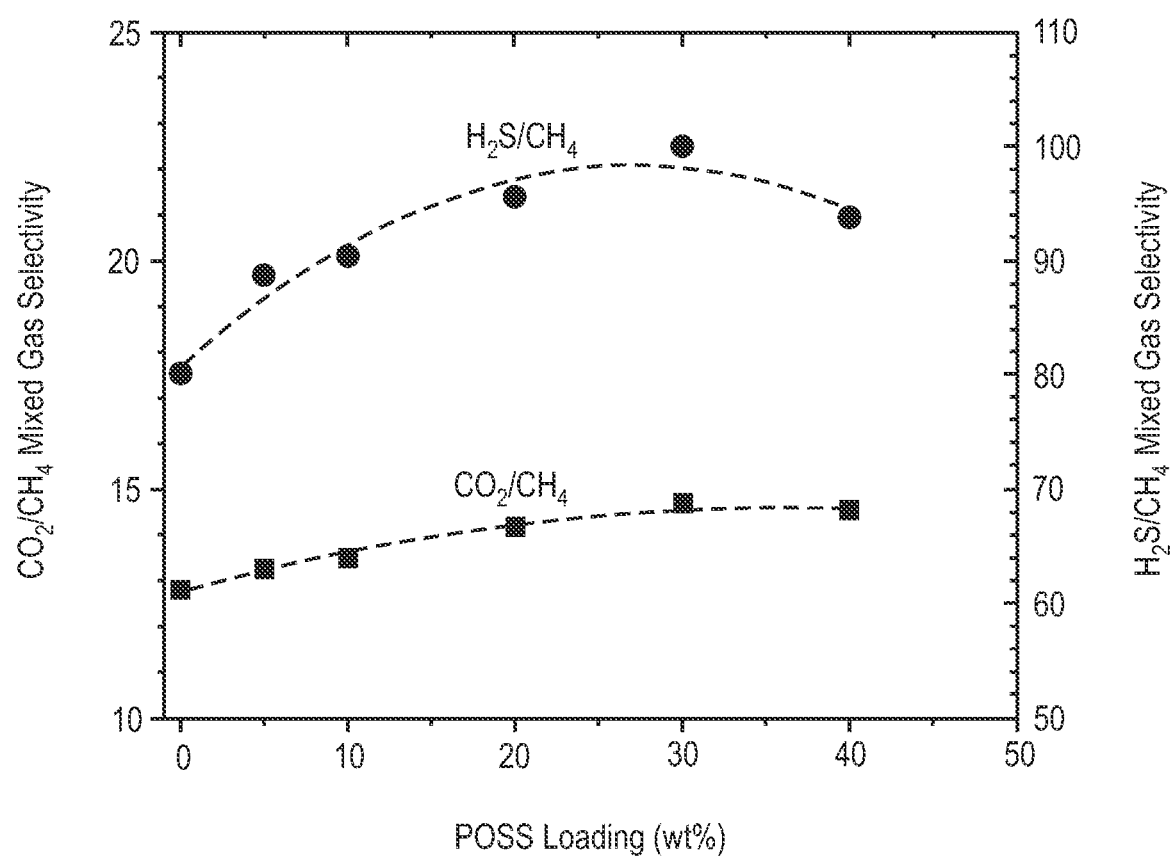
FIG. 16 is a plot of the effect of POSS loading on the separation performance of PEBA/XLPOSS membranes.

FIG. 16 is a plot of the effect of POSS loading on the separation performance ($CO_2/CH_4$ and $H_2S/CH_4$ selectivities) of PEBA/XLPOSS hybrid membranes. The tests were run using a 20% sour gas feed that included five component gases, 10 vol. % $CO_2$, 20 vol. % $H_2S$, 10 vol. % $N_2$, 3 vol. % $C_2H_6$, and 57 vol. % $CH_4$, at 25° C. and 800 psi.

As can be seen in FIG. 16, the selectivities of $CO_2/CH_4$ and $H_2S/CH_4$ increased with the increase of crosslinked POSS nanoparticles up to POSS loading of 30 wt. %. The addition of crosslinked POSS nanoparticles improved the $H_2S$ separation (25% increase in $H_2S/CH_4$ selectivity) compared to the $CO_2$ separation (15% increase in $CO_2/CH_4$ selectivity), indicating that these hybrid membranes have high $H_2S$ separation efficiency ($H_2S$-selective membrane) under the high-pressure 20% sour gas feed.

An embodiment described in examples herein provides a gas separation membrane. The gas separation membrane includes a polyether-block-polyamide (PEBA) matrix and a cross-linked network including functionalized polyhedral oligomeric silsesquioxane (POSS) nanoparticles dispersed through the PEBA matrix.

In an aspect, the functionalized POSS nanoparticles include functional organic substituents at each of eight vertices. In an aspect, the functional organic substituents include acrylate groups. In an aspect, the functional organic substituents include methacrylate groups.

In an aspect, the cross-linked network includes polyacrylate chains between the functionalized POSS nanoparticles. In an aspect, the cross-linked network includes polymethacrylate chains between the functionalized POSS nanoparticles.

In an aspect, the functionalized POSS nanoparticles include between about 2.5 weight percent (wt. %) and about 50 wt. % of the gas separation membrane. In an aspect, the functionalized POSS nanoparticles include between about 10 wt. % and about 40 wt. % of the gas separation membrane. In an aspect, the gas separation membrane includes a free radical photoinitiator to form the cross-linked network.

Another embodiment described in methods herein provides a method for forming a gas separation membrane. The method includes forming a polymer solution of polyether-block-polyamide (PEBA) and forming a suspension of functionalized polyhedral oligomeric silsesquioxane (POSS) nanoparticles. A first portion of the polymer solution is blended with the suspension to coat the functionalized POSS nanoparticles with PEBA, forming a primed suspension. The remaining portion of the polymer solution is blended with the primed suspension to form a PEBA/POSS solution. A free radical photoinitiator is added to the PEBA/POSS solution. A dense film is formed from the PEBA/POSS solution. The dense film is dried to form a dried film including functionalized POSS nanoparticles in a PEBA matrix. The dried film is exposed to ultraviolet (UV) radiation to cross-link the functionalized POSS nanoparticles in the PEBA matrix forming a PEBA/XLPOSS membrane.

In an aspect, the polymer solution is formed by dissolving the PEBA in a mixture of ethanol and deionized water. In an aspect, the suspension of functionalized POSS nanoparticles is formed by mixing the functional POSS nanoparticles into a mixture of ethanol and deionized water, and sonicating the suspension until the functional POSS nanoparticles are evenly distributed.

In an aspect, an amount of functionalized POSS nanoparticles is used to form the suspension that is between about 2.5 wt. % of the amount of PEBA and about 50 wt. % of the amount of PEBA.

In an aspect, blending the first portion of the polymer solution includes blending 25% of the volume of the polymer solution with the suspension.

In an aspect, the free radical photoinitiator is added in an amount of about 4 wt. % of the amount of the functionalized POSS nanoparticles. In an aspect, the dense film is formed by allowing the solvent to slowly evaporate. In an aspect, the dense film is dried under a vacuum at about 60° C. for about 48 hours. In an aspect, the dried film is exposed to the UV radiation for about 180 seconds at 25° C. with an intensity of about 12,000 mW/cm2.

Another embodiment described in examples herein provides a method for removing an acid gas from a natural gas feedstock to form a sweetened natural gas. The method includes flowing the natural gas feedstock over a membrane, wherein the membrane includes a polyether-block-polyamide (PEBA) matrix and a cross-linked network including functionalized polyhedral oligomeric silsesquioxane (POSS) nanoparticles dispersed through the PEBA matrix. The acid gases isolated in a permeate from the membrane. The sweetened natural gas is produced in a retentate from the membrane.

In an aspect, the membrane is formed by forming a polymer solution of polyether-block-polyamide (PEBA), forming a suspension of functionalized polyhedral oligomeric silsesquioxane (POSS) nanoparticles, and blending a first portion of the polymer solution with the suspension to coat the functionalized POSS nanoparticles with PEBA, forming a primed suspension. The remaining portion of the polymer solution is blended with the primed suspension to form a PEBA/POSS solution. A free radical photoinitiator is added to the PEBA/POSS solution. A dense film is formed from the PEBA/POSS solution. It is film is dried to form a dried film including functionalized POSS nanoparticles in a PEBA matrix. The dried film it is exposed to ultraviolet (UV) radiation to cross-link the functionalized POSS nanoparticles in the PEBA matrix.

In an aspect, the suspension is formed from acrylate functionalized POSS nanoparticles. In an aspect, the suspension is formed from methacrylate functionalized POSS nanoparticles. In an aspect, a gas separation membrane is formed from the membrane.

Other implementations are also within the scope of the following claims.

What is claimed is:

1. A method for removing an acid gas from a natural gas feedstock to form a sweetened natural gas, comprising:
    flowing the natural gas feedstock over a membrane, wherein the membrane comprises:
        a polyether-block-polyamide (PEBA) matrix; and
        a cross-linked network comprising functionalized polyhedral oligomeric silsesquioxane (POSS) nanoparticles dispersed through the PEBA matrix;
    isolating the acid gas in a permeate from the membrane; and
    producing the sweetened natural gas in a retentate from the membrane.

2. The method of claim 1, comprising forming the membrane by:
    forming a polymer solution of polyether-block-polyamide (PEBA);
    forming a suspension of functionalized polyhedral oligomeric silsesquioxane (POSS) nanoparticles;
    blending a first portion of the polymer solution with the suspension to coat the functionalized POSS nanoparticles with PEBA, forming a primed suspension;
    blending the remaining portion of the polymer solution with the primed suspension to form a PEBA/POSS solution;
    adding a free radical photoinitiator to the PEBA/POSS solution;
    forming a dense film from the PEBA/POSS solution;
    drying the dense film to form a dried film comprising functionalized POSS nanoparticles in a PEBA matrix; and
    exposing the dried film to ultraviolet (UV) radiation to cross-link the functionalized POSS nanoparticles in the PEBA matrix.

3. The method of claim 2, comprising forming the suspension from acrylate functionalized POSS nanoparticles.

4. The method of claim 2, comprising forming the suspension from methacrylate functionalized POSS nanoparticles.

5. The method of claim 2, comprising forming a gas separation membrane from the membrane.

* * * * *